United States Patent
Desai

(10) Patent No.: US 12,080,087 B2
(45) Date of Patent: *Sep. 3, 2024

(54) CLASSIFYING PHARMACOVIGILANCE DOCUMENTS USING IMAGE ANALYSIS

(71) Applicant: Bristol-Myers Squibb Company, Princeton, NJ (US)

(72) Inventor: Sameen Mayur Desai, Morris Plains, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,998

(22) Filed: Aug. 28, 2023

(65) Prior Publication Data

US 2023/0410544 A1    Dec. 21, 2023

Related U.S. Application Data

(63) Continuation of application No. 17/345,632, filed on Jun. 11, 2021, now Pat. No. 11,790,681.

(60) Provisional application No. 63/056,501, filed on Jul. 24, 2020.

(51) Int. Cl.
| | |
|---|---|
| *G06V 30/413* | (2022.01) |
| *G06F 16/55* | (2019.01) |
| *G06F 16/583* | (2019.01) |
| *G06N 3/08* | (2023.01) |
| *G06V 30/414* | (2022.01) |

(52) U.S. Cl.
CPC ............ *G06V 30/413* (2022.01); *G06F 16/55* (2019.01); *G06F 16/583* (2019.01); *G06N 3/08* (2013.01); *G06V 30/414* (2022.01)

(58) Field of Classification Search
CPC .... G06V 30/40; G06V 30/413; G06V 30/414; G06V 2201/10; G06N 3/08; G06F 16/55; G06F 16/583
See application file for complete search history.

(56) References Cited

U.S. PATENT DOCUMENTS

2011/0137898 A1    6/2011    Gordo et al.
2015/0324451 A1    11/2015   Cormack et al.

FOREIGN PATENT DOCUMENTS

EP    3483784 A2    5/2019

OTHER PUBLICATIONS

Rusiflol et al: "Multimodal page classification in administrative document image streams", IJDAR, vol. 17, Jul. 1, 2014 (Jul. 1, 2014), pp. 331-341, XP055844004, DOI: 10.10071s10032-014-0225-8.

International Search Report and Written Opinion for International Application No. PCT/US2021/036986, mailed Oct. 13, 2021, 20 pages.

(Continued)

*Primary Examiner* — Daniel G Mariam

(74) *Attorney, Agent, or Firm* — Honigman LLP; Grant Griffith

(57) ABSTRACT

Provided herein are systems, apparatus, device, method, and/or computer program product embodiments, and/or combinations and sub-combinations thereof, for classifying a document using image analysis. In an embodiment, a server may train and implemented a deep learning model to classify documents using image representations of the documents.

20 Claims, 23 Drawing Sheets

(56) References Cited

OTHER PUBLICATIONS

Audebert et al: "Multimodal deep networks for text and image-based document classification", ARXIV.org <http://ARXIV.org>, Cornell University Library, 201 Olin Library Cornell University Ithaca, NY 14853, Jul. 15, 2019 (Jul. 15, 2019), 8 pages, KP081441994.
Sameen Mayur Desai: "Image Fingerprinting as a Means for Individual Case Safety Report Seriousness lassification" Drug Information Association (DIA) Global Annual Meeting, Jun. 14-18, 2020, 1 page.

FIG. 7

CLASSIFYING PHARMACOVIGILANCE DOCUMENTS USING IMAGE ANALYSIS

CROSS REFERENCE TO RELATED APPLICATIONS

This U.S. patent application is a continuation of, and claims priority under 35 U.S.C. § 120 from, U.S. patent application Ser. No. 17/345,632, filed on Jun. 11, 2021, which claims priority under 35 U.S.C. § 119(e) to U.S. Provisional Application 63/056,501, filed on Jul. 24, 2020. The disclosures of these prior applications are considered part of the disclosure of this application and are hereby incorporated by reference in their entireties.

TECHNICAL FIELD

This disclosure relates to classifying pharmacovigilance documents using image analysis.

BACKGROUND

Entities, such as companies, government institutions, educational institutions, or the like, often receive thousands of documents that include a combination of text, images, charts, tables, and other forms of data/information/knowledge representations. These documents may be of different types, including MICROSOFT WORD, MICROSOFT EXCEL documents, png, tiff, jpg, raw, gif, PDFs, emails, txt files, handwritten notes, HTML, XML scanned documents, or the like. Manually classifying and prioritizing such documents based on their content may be a burdensome and error-prone task. Entities have attempted to automate the process using certain types of machine-learning algorithms, such as natural language processing (NLP). However, the machine-learning models that have been used require manual extraction of information or highly intelligent third-party tools to extract the text contents of each PDF with acceptable accuracy (e.g., optical character recognition (OCR)) and correctly extract and piece these data back together in a machine-readable format. Furthermore, conventional methodologies implementing such machine-learning models may face many obstacles when attempting to extract text from a document, such as optical clarity, alphanumeric characters, orientation, or the like. As such, these NLP machine-learning models may take years to train and implement while also proving to be costly. Therefore, conventional methods of classifying and prioritizing documents may be burdensome, costly, and error-prone.

SUMMARY

Provided herein are system, apparatus, device, method, and/or computer program product embodiments, and/or combinations and sub-combinations thereof, for classifying documents using image analysis.

A given embodiment includes a computer-implemented method for automatically classifying documents. In a given embodiment, a set of documents and metadata for each document are retrieved. Each of the documents of the set of documents is converted into an image file. This results in a set of image files. A learning engine is trained to classify each document of the set of documents using the set of image files and the metadata corresponding to each respective document. A request to classify a different document is received. The different document is converted into a new image file. The pages of the image file are blended into a single image stack. The learning engine assigns a first, second, and third classification to the different document based on the single image stack. The learning engine determines a priority value of the different document based on one or more of the first, second, or third classification.

Another embodiment includes a system for automatically classifying documents. The system may include a memory and a processor coupled to the memory. In an embodiment, the processor is configured to retrieve a set of documents and metadata for each document in the set of documents. The processor is further configured to convert each document of the set of documents into an image file, resulting in a set of image files. Furthermore, the processor trains a learning engine to classify each document of the set of documents using the set of image files. The processor is further configured to receive a request to classify a different document, convert the different document into a new image file, and blend pages of the different image file into a single image stack. Then, the processor, using the trained learning engine, assigns a first, second, and third classification to the different document based on the single image stack. The processor, using the trained learning engine, determines a priority value of the different document based on one or more of the first, second, or third classification.

A further embodiment includes a non-transitory computer-readable medium having instructions stored thereon, execution of which, by one or more processors of a device, cause the one or more processors to perform operations. In an embodiment, the operations include retrieving a set of documents and metadata for each document in the set of documents. The operations further include converting each document of the set of documents into an image file, resulting in a set of image files. Furthermore, the operations include training a learning engine to classify each document of the set of documents using the set of image files. The operations further include receiving a request to classify a different document, converting the different document into a new image file, and blending pages of the different image file into a single image stack. Moreover, the operations include assigning, using the trained learning engine, a first, second, and third classification to the different document based on the single image stack. The operations further include determining a priority value of the different document based on one or more of the first, second, or third classification.

In a given embodiment, the first classification corresponds to the validity of the different document. The second classification corresponds to an indicator of the seriousness of the content on the different document. The third classification corresponds to one or more elements corresponding to the seriousness of the content.

Another embodiment includes a device including a memory and a processor coupled to the memory. The processor is configured to retrieve a set of documents and metadata for each document in the set of documents and convert each document of the set of documents into an image file, resulting in a set of image files. Furthermore, the processor is configured to train a learning engine to classify each document of the set of documents using the set of image files and the metadata corresponding to each respective document of the set of documents. The processor is further configured to receive a request to classify a different document and blend pages of the different document into a single image stack. The processor is further configured to assign, using the trained learning engine, a classification to the different document based on the single image stack and cause display of the classification.

The details of one or more implementations of the disclosure are set forth in the accompanying drawings and the description below. Other aspects, features, and advantages will be apparent from the description and drawings, and from the claims.

DESCRIPTION OF DRAWINGS

The accompanying drawings, which are incorporated herein and form part of the specification, illustrate the present disclosure and, together with the description, further serve to explain the principles of the disclosure and enable a person skilled in the relevant art to make and use the disclosure.

FIG. 7 is an example single image stack, according to example embodiments.

The drawing in which an element first appears is typically indicated by the leftmost digit or digits in the corresponding reference number. In the drawings, like reference numbers may indicate identical or functionally similar elements.

DETAILED DESCRIPTION

Figure 1:
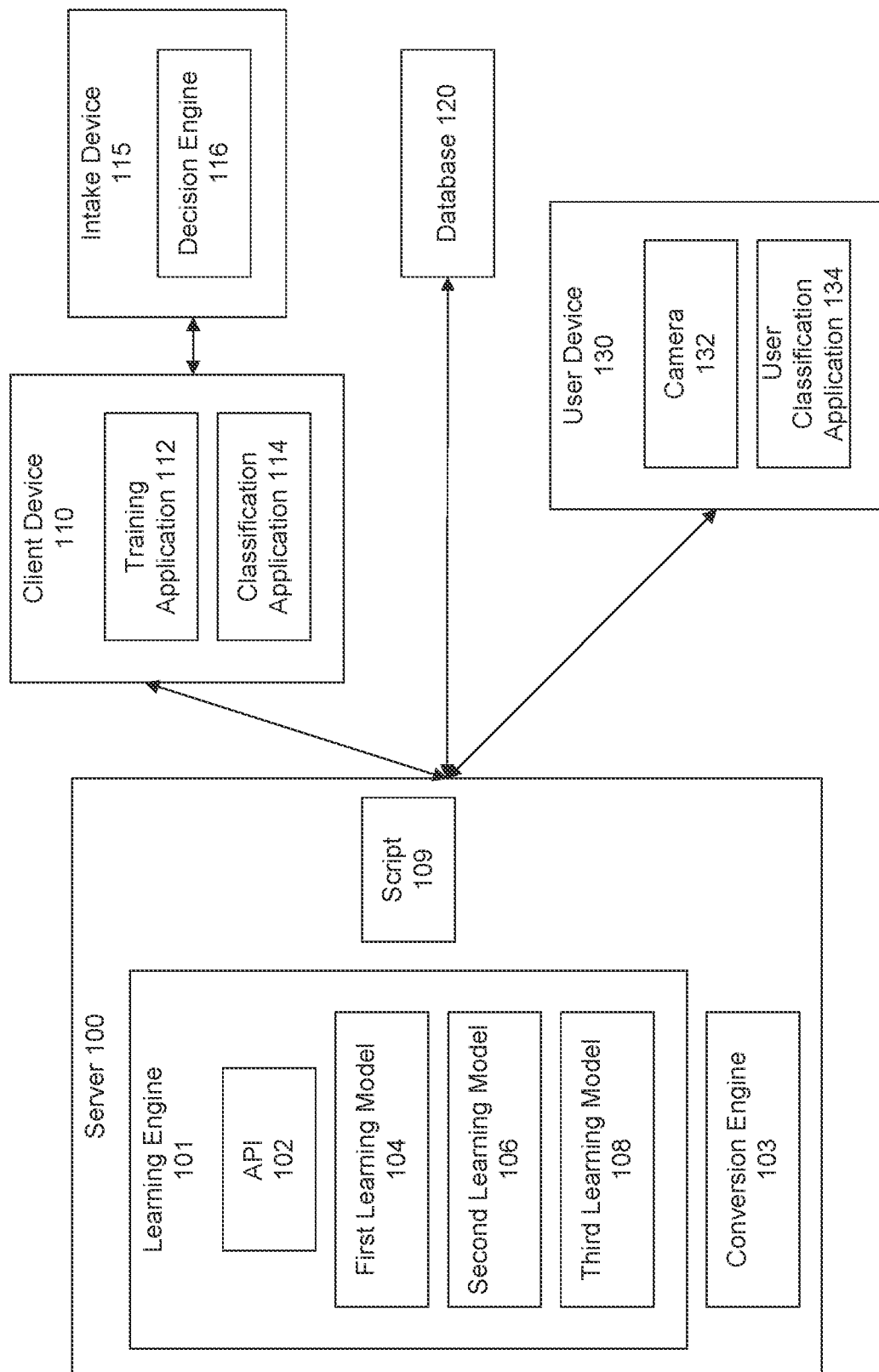
FIG. 1 is a block diagram of an example system for classifying documents using image analysis.

Provided herein are system, apparatus, device, method, and/or computer program product embodiments, and/or combinations and sub-combinations thereof, for classifying documents using image analysis.

As described above, conventional methods for classifying and prioritizing documents may be burdensome, costly, and error-prone. For example, the fields of pharmacovigilance (PV), e-discovery, regulatory industries, etc., involve classifying large amounts of documentation. This may require executing optical character recognition (OCR) and manually classifying the documents. This can be error-prone and operationally costly.

As an example, in the field of pharmacovigilance (PV) operations, companies receive documents such as individual case safety reports (ICSRs) regarding various drugs. The PV documents may include important medical information about a user. It may be important to quickly determine the seriousness of the medical information indicated in the PV document. For example, an ICSR is a written report of an adverse event experienced by a patient undergoing a particular treatment or taking a particular drug, which may potentially be linked to that treatment or drug.

For an ICSR to be considered "valid," the ICSR must contain information related to four elements: an identifiable patient, an identifiable reporter, a suspect drug, and an adverse event. If an ICSR is valid, it is determined whether or not the adverse event described is a "serious" adverse event. An adverse event is a serious adverse event if it satisfies one of the following requirements: results in death or is life-threatening, requires inpatient hospitalization or extends an existing hospitalization; results in persistent or significant disability or incapacity; results in a congenital disability; or is otherwise medically significant because treatment and/or intervention is required to prevent one of the preceding requirements. Furthermore, when performing clinical trials of drugs or other products, it may be determined whether an adverse effect indicated in the ICSR form is a serious unexpected result adverse reaction (SUSAR).

An IC SR may correspond with a particular case. Different regulatory organizations may require action to be taken on cases having a corresponding IC SR. Regulatory organizations may provide different timelines for different cases. For example, if a case includes a serious adverse effect listed in the ICSR, the case may be prioritized so that a company can take action on this case. Conversely, if a case includes a non-serious adverse effect in the ICSR, the case may be given a lower priority.

A PV document may be provided in various formats, such as MICROSOFT WORD, MICROSOFT EXCEL documents, png, tiff, jpg, raw, gif, emails, PDFs, txt files, handwritten notes, HTML, XML scanned documents, or the like. A PV document may also be a combination of multiple formats. For example, a PV document may be in .doc format; however, it may also include an embedded JPEG image. In another example, a portion of the ICSR document may be an email message as while another portion may be in a MICROSOFT Word or MICROSOFT Excel format.

The PV document may come from various reporters, such as a pharmacy, a clinician, or a patient. Furthermore, each of the documents may include a reported adverse effect of a drug along with other information about the drug. A company may need to determine, for example, whether the document is a valid PV document, the seriousness of the content of the PV document (e.g., a seriousness of an adverse effect listed in the ICSR document), and a seriousness, relatedness, and expectedness (SRE) of the content of the PV document. Given the number of reports and various types of formats of the documents, classifying the documents in such a manner may prove to be a challenging task. Therefore, conventional methods may not be able to classify PV documents effectively and efficiently.

For example, conventional methods may include a subject matter expert (SME) manually reviewing PV documents and making a determination. Or, an individual may manually extract relevant information from a PV document and input the information into a database, which a medical professional subsequently reviews to classify the PV document. However, companies may receive thousands of PV documents over a short time period. Given the large number of PV documents that a company may receive, the manual review of the PV documents may be a burdensome task. Furthermore, many of the PV documents may be irrelevant as they may not be valid documents, may not indicate a serious effect, or may not indicate a serious, related, or expected effect. This can create large backlogs and delays in processing the relevant and important PV documents.

Conventional methods may also include using machine-learning algorithms that require the documents to be converted to text (e.g., through optical character recognition (OCR)) prior to operation. These machine-learning algorithms may include Natural Language Processing (NLP)/ Named Entity Recognition (NER). Combined with the complexity of OCR and creating normalized templates, these machine-learning algorithms require significant time and human and financial resources to train and implement and update the algorithms. For example, training and implementing machine-learning algorithms, such as NLP/NER and text conversion methods to classify PV documents may take over two years using 90 developers. As such, these machine-learning algorithms can be operationally inefficient and costly to train and implement.

In a given embodiment, a server may automatically classify pharmacovigilance (PV) documents. Specifically, the server may retrieve a set of PV documents and metadata for each PV document in the set of PV documents. The server may convert each PV document of the set of PV documents into an image file, resulting in a set of image files. Furthermore, the server may train a learning engine to classify each PV document of the set of PV documents using the set of image files. The learning engine may implement a convolutional neural network (CNN). The server may further receive a request to classify a different PV document, convert the different PV document into a new image file, and blend pages of the different image file into a single image stack. Moreover, the server may use the trained learning engine to assign a first, second, and third classification to the different PV document based on the single image stack.

The set of PV documents and the different PV document are reports of adverse events experienced by patients undergoing treatments or taking medication. The first classification corresponds to the validity of the different PV document. The second classification corresponds to a seriousness of an adverse effect indicated on the different PV document. The third classification corresponds to whether the adverse effect indicated on the different PV document is serious, related, and expected.

The above configuration allows for processing and classifying multiple document formats and languages without transcribing and extracting data entities from source documents. This allows for classifying documents upon intake and provides an opportunity for an entity to scale up data intake. Furthermore, compared to conventional machine-learning methodologies, the above configuration requires ¼ of the time to train and implement a learning model and approximately ¹/₂₅ of the human and financial resources. As indicated above, training and implementing machine-learning algorithms, such as NLP/NER to classify ICSR documents may take, in one known example, over two years using 90 individuals, including developers, data scientists, and subject matter experts. By comparison, embodiments of the present disclosure may take two months to train and implement using three individuals. In the field of PV, efficiently classifying and prioritizing documents reduces costs and increases efficiencies and consistency in data collection to enhance signal detection and risk management. This allows for more robust analyses and a more in-depth characterization of the safety/risk-benefit of products.

Furthermore, the above configuration bypasses text processing, including but not limited to transcription and translation, by leveraging image processing. This methodology increases the speed at which models may be trained to understand domain concepts within PV and beyond, using image representations of documents.

In some embodiments, a user device may implement a fully trained learning engine configured to classify PV documents. Specifically, the user device may locally capture an image of a PV document and assign a classification of the PV document. The fully trained learning engine implemented on the user device may not identify or extract any PII from the PV document when assigning the classification. This configuration allows a user to determine a seriousness of a medical condition or situation described in the PV document without sharing or transmitting PII over a network. By doing so, this configuration eliminates security concerns involving sharing PII, such as phishing, cyberattacks, hacking, or the like.

FIG. 1 is a block diagram of a system for classifying documents using image analysis. The system may include a server 100, client device 110, intake device 115, database 120, and user device 130. The devices of the system may be connected through a network. For example, the devices of the system may be connected through wired connections, wireless connections, or a combination of wired and wireless connections. In an example embodiment, one or more portions of the network may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks. Alternatively, server 100, client device 110, and database 120 may be located on a single physical or virtual machine.

In some embodiments, server 100 and database 120 may reside in a cloud-computing environment. In other embodiments, server 100 may reside in a cloud-computing environment, while database 120 resides outside the cloud-computing environment. Furthermore, in other embodiments, server 100 may reside outside the cloud-computing environment, while database 120 resides in the cloud-computing environment.

Intake device 115 may be a device operated by individuals associated with the administrator of server 100. Intake device 115 may be configured to receive documents to be classified. Intake device 115 may be an email server or other servers that can receive bulk data. Intake device 115 may include a decision engine 116. The decision engine 116 may be an executable application configured to determine whether a document needs to be classified. The operations of a decision engine will be described in further detail with respect to FIG. 2.

Client device 110 may be a device operated by individuals associated with the administrator of server 100 (e.g., programmers, users, etc.). Client device 110 may include a training application 112 and classification application 114. The cloud-computing environment may also host training application 112 and classification application 114. Alternatively, one or both training application 112 and classification application 114 may be installed on client device 110 or intake device 115.

Training application 112 and classification application 114 may be executable applications configured to interface with server 100. Training application 112 may transmit requests to server 100 to train a learning model to classify documents using image analysis. Classification application 114 may be configured to transmit requests to server 100 to classify a documenting using a learning model. Classification application 114 may also be installed on and executed by third-party user devices. In this regard, authorized third parties may transmit requests to classify documents using server 100.

Classification application 114 may include a mail or messaging service. Moreover, the mail or messaging service may include an inbox configured to store or hold documents to be classified.

Database 120 may be one or more data storage devices configured to store documents of various types and formats. Database 120 may store structured or unstructured data.

User device 130 may include a camera 132 and user classification application 134. User classification application 134 may be configured to implement a fully trained learning model to classify documents in images captured by camera 132. Alternatively, a user may upload a document (e.g., from email, local memory, external memory coupled to user device 130, etc.) using user classification application 134 for classification, and user classification application 134 may classify the uploaded document. User device 130 may be operated by users, such as patients. Patients may receive a classification of a given PV document using user classification application 134. User classification application 134 may also transmit the classification of the given PV document to server 100. Server 100 may store the classification in database 120.

In some embodiments, user classification application 134 may transmit requests to server 100 to classify documents. User classification application 134 may include a mail or messaging service. Moreover, the mail or messaging service may include an inbox configured to store or hold documents to be classified.

Server 100 may include a learning engine 101, conversion engine 103, and script 109. Script 109 may be an automated script or bot configured to poll the inbox in the mail or messaging service included in classification application 114 or user classification application 134 to detect documents that are to be classified. Script 109 may be scheduled to periodically poll the inbox in the mail or messaging service included in classification application 114 or user classification application 134. Once script 109 retrieves the document from the inbox in the mail or messaging service included in classification application 114 or user classification application 134, script 109 may transmit the document to conversion engine 103.

Conversion engine 103 may be configured to convert documents into image files so that learning engine 101 may use the image files to classify and prioritize the corresponding documents. In some embodiments, the documents are converted directly into image files. In some other embodiments, this is a two-step process, where an electronic document is first converted into, for example, a Portable Document Format (PDF) file, and then the PDF file is converted into an image file. Conversion engine 103 may use a word processing application such as LibreOffice, developed by The Document Foundation of Berlin, Germany, for example. The word processing application may be configured to save a document as a PDF file. Conversion engine 103 may use a file converter application to convert a PDF file into an image file, such as Ghostscript. The file converter application may be configured to raster the PDF file into a JPEG image file. Furthermore, conversion engine 103 may be configured to blend all pages of an image file into a single image stack using an image manipulation application. The single image stack may be a composite of each page of an image file. As such, conversion engine 103 may generate a single image stack for each image file. In the event an image file includes a single page, conversion engine 103 may convert the single page into a white-scale or grayscale image. The single image stack may include a white-scale or grayscale image representation of the single page of the corresponding document. In other embodiments, conversion engine 103 may convert the single page into a different scale, and a single image stack for the single page may include a scaled image representation of the single page of the corresponding document. The image file may include the single image stack. The single image stack may include an image fingerprint that a CNN algorithm can use to classify the image using image analysis. The image files corresponding to the documents may be provided as inputs for learning engine 101 for training a learning model.

Image fingerprinting provides a substantial amount of data for training and testing a learning model. For example, as an experiment, the learning model can be trained and tested using ICSR documents received over, e.g., a ten-year span. This represents a 12 times increase in the number of ICSRs utilized when compared with the traditional training corpus approach for text-based learning. With image fingerprinting, maintaining and updating the learning model may be set for a periodic schedule, during which all ICSRs received during that time period would be provided to the learning model as an input for tuning.

Learning engine 101 may include API 102, a first learning model 104, second learning model 106, and third learning model 108. API 102 may be configured to receive requests to classify documents from conversion engine 103. API 102 may forward the requests to first learning model 104.

First learning model 104, second learning model 106, and third learning model 108 may be configured to recursively implement a deep machine-learning algorithm, such as a convolutional neural network (CNN), to classify and prioritize documents, using image representations of the documents. First learning model 104, second learning model 106, and third learning model 108 may be trained to generate a first, second, and third classification for a document, respectively. Each of these classifications will be explained in further detail below. In some embodiments, fewer or more learning modules may be used to classify a set of documents. For example, additional learning models may be used to assign further classifications for the set of documents. Alternatively, a single learning model may be configured to assign multiple classifications for the set of documents.

Figure 2A:
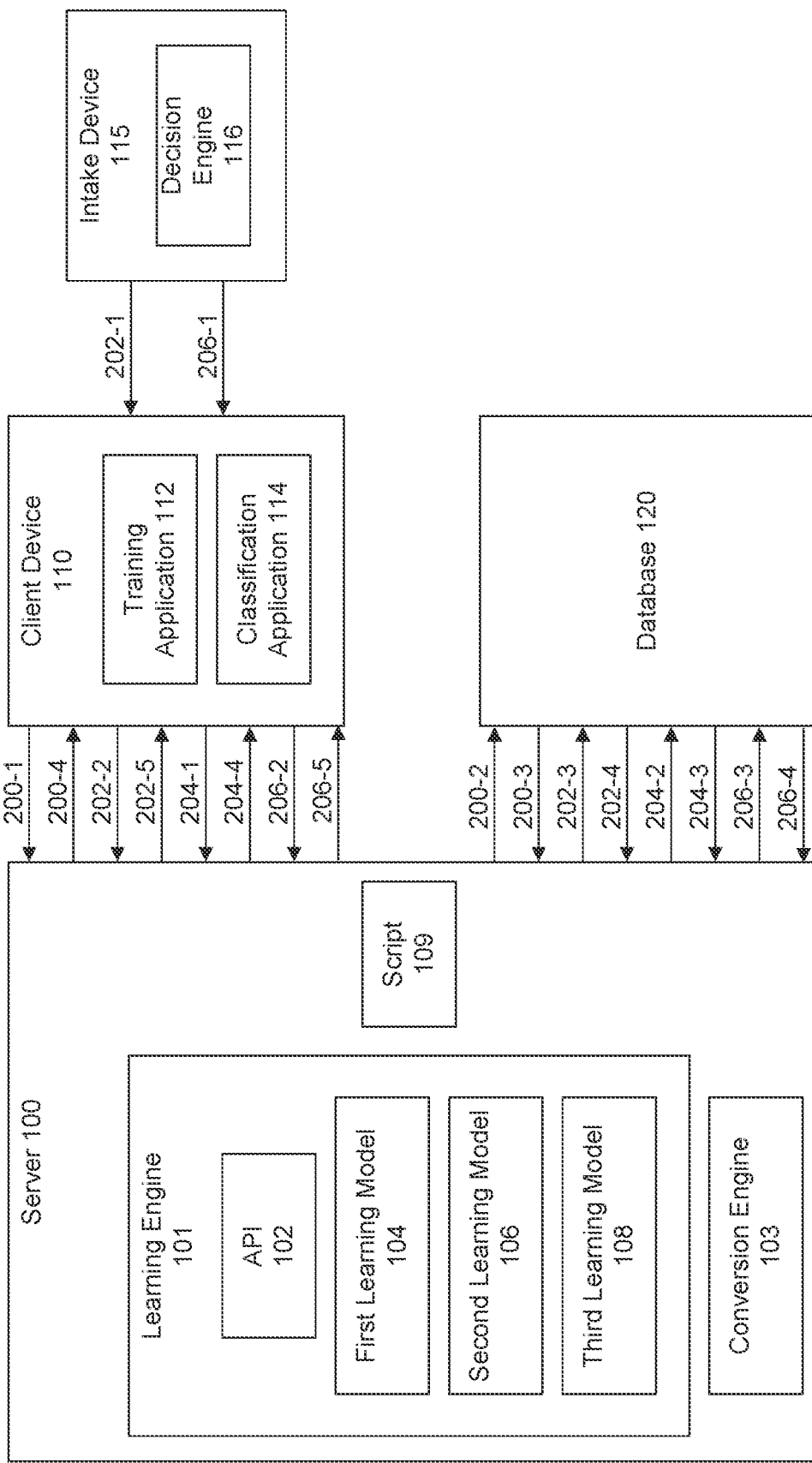
FIG. 2A is a block diagram of data flow in the system for classifying documents using image analysis shown in FIG. 1.

FIG. 2A is a block diagram of data flow in the system for classifying documents using image analysis. As described above, the system for classifying documents using image analysis may include server 100, client device 110, and database 120. Client device 110 may include training application 112 configured to interface with server 100.

Training application 112 may transmit a request 200-1 to train first learning model 104, second learning model 106, and third learning model 108 of learning engine 101 using a set of documents. Request 200-1 may include a query 200-2 for retrieving the set of documents and its corresponding metadata from database 120.

Server 100 may receive request 200-1. Conversion engine 103 may transmit query 200-2 to database 120 to retrieve the set of documents and its corresponding metadata. The metadata corresponding to a document may include a first, second, and third classification for the document identified by a subject matter expert (SME) or a third party. Alternatively, the first, second, and third classification included in the metadata may be previously assigned by first, second, and third learning models 104-108. Database 120 may transmit a response 200¬3 to server 100. Response 200-3 may include the set of documents and the corresponding metadata for each document. The set of documents may be provided in various formats, such as MICROSOFT WORD, MICROSOFT EXCEL documents, png, tiff, jpg, raw, gif, PDFs, txt files, handwritten notes, HTML, XML, emails, scanned documents, or the like. A given document may also be a combination of multiple formats. For example, the given document may be in .doc format; however, it may also include an embedded JPEG image. In another example, a portion of the given document may be an email message as while another portion may be in a .doc format.

Conversion engine 103 may confirm that each document of the set of documents is in a common format. PDF format will be referred to herein, although other formats may additionally or alternatively be used. In the event a given document is not in a PDF format, conversion engine 103 may convert the given document into a PDF format. Conversion engine 103 may then convert each document, now in PDF format, into an image file. As such, conversion engine 103 may generate an image file for each document, resulting in a set of image files. In some embodiments, conversion engine 103 may convert a given document from the set of documents directly into an image file, even if the given document is not in a PDF format. The image file may be, for example, a JPEG image file. The JPEG image file may include an image representation of the corresponding document.

Furthermore, conversion engine 103 may generate a single image stack for each image file. The single image stack may include a composite of all pages of a given image file. The single image stack for each document may be, for example, a JPEG image. In the event an image file includes a single page, conversion engine 103 may convert the single page into a white-scale or grayscale image. The single image stack may include a white-scale or grayscale image representation of the single page of the corresponding document. In other embodiments, conversion engine 103 may convert the single page into a different scale, and a single image stack for the single page may include a scaled image representation of the single page of the corresponding document. In the event the given document is multiple pages, the single image stack for the document may include all the pages of the given document blended as a single JPEG image, as will be further discussed with respect to FIG. 6. Each image file may include the corresponding single image stack of the image file. By blending the pages of the image file, conversion engine 103 creates an image fingerprint. The CNN algorithm may use the image fingerprint to classify the image file using image analysis.

Conversion engine 103 may transmit the image files, parameters for characterizing the image files for the set of documents, and metadata corresponding to the set of documents to learning engine 101 for training first learning model 104, second learning model 106, and third learning model 108 to classify each document of the set of documents. The parameters for characterizing the image files may include a sender of the document (corresponding to an image file), a time the document was received, and an urgency value associated with the document. The parameters may include characteristics about the image files, such as watermarks, markings, redactions, or the like. Learning engine 101 may receive the image files for the set of documents, parameters characterizing the image file and metadata corresponding to the set of documents.

Learning engine 101 may train first, second, and third learning models 104-108 to assign a first, second, and third classification to documents using the set of image files. Learning engine 101 may train first, second, and third learning models 104-108, serially, or in parallel. In particular, learning engine 101 may instruct first, second, and third learning models 104-108 to recursively assign a first, second, and third classification to the set of documents corresponding to the set of image files and validate the classifications against the metadata of the documents. First, second, and third learning models 104-108 may implement one or more CNN algorithms to assign the respective classification and validate the classification. Furthermore, the CNN algorithm may use image analysis to identify patterns in the set of image files to identify particular features in images. In some embodiments, the CNN algorithm may use the parameters indicating the characterizations of the image files to identify patterns in the set of image files. For example, the CNN algorithm may take into account any redactions, watermarks, or other markings when performing the image analysis. The CNN algorithm may use the learned features to classify a given document corresponding to a given image file. The CNN algorithm will be described in further detail with respect to FIG. 3. While a CNN algorithm is particularly useful for processing images and will thus be referred to herein, a skilled artisan would understand that other statistical learning models may be used in addition to or instead of a CNN.

First, second, and third learning models 104-108 may be configured to identify a first, second, and third pattern, respectively, in the image representations of the alphanumeric text across the set of image files, using the CNN algorithms. The first, second, and third patterns may include similarities in features extracted from other image files. Furthermore, the first, second, and third patterns may include differences in features extracted from other image files. First, second, and third learning models 104-108 may use the first, second, and third patterns to identify or recognize features in a given image file. Based on the identification or recognition of the features of the given image file, first, second, third learning models 104-108 may respectively identify a first, second, and third attribute associated with the given image file. Therefore, first, second, third learning models 104-108 may respectively identify a first, second, and third attribute for each image file of the set of image files. Furthermore, first, second, and third learning models 104-108 may use the first, second, and third attributes to respectively assign the first, second, and third classification to the document of the set of documents.

First, second, and third learning models 104-108 may respectively validate the first, second, and third classification of each subset of documents of the set of documents. In particular, first, second, and third learning models 104-108 may compare the metadata for each document to the classification of each document of the set of documents. As indicated above, the metadata for each document may include a first, second, and third classification of the document, as identified by an SME or a third party. In the event the first, second, and third classification assigned to a given document by first, second, and third learning models 104-108 matches the metadata for the given document, the respective learning model (first, second, or third) may determine that the assigned classification is correctly assigned. In the event the first, second, or third classification assigned to a given document by first, second, and third learning models 104-108 does not match the metadata for the given document, the respective learning model (first, second, or third) may determine that the assigned classification is incorrectly assigned. First, second, third learning models 104-108 may generate validation results. Validation results may include correctly classified documents and incorrectly classified documents.

Learning engine 101 may instruct first, second, and third learning models 104-108 to recursively execute the CNN algorithm(s) on each image file of the set of image files to classify each corresponding document of the set of documents over a predetermined number of iterations. First, second, and third learning models 104-108 may generate validation results after each iteration. First, second, and third learning models 104-108 may use the validation results to optimize the CNN algorithm and better identify features in a given image file.

The predetermined number of iterations or other parameters may be included in request 200-1. Alternatively, the predetermined number of iterations may be preprogrammed by learning engine 101. In response to completing the predetermined number of iterations and other parameters by each of first, second, and third learning models 104-108, first, second, and third learning models 104-108 may be considered fully trained. Server 100 may transmit response 200-4 to client device 110. Response 200-4 may indicate that first, second, and third learning models 104-108 are entirely trained to assign a first, second, and third classification to a given document.

Intake device 115 may receive a different document for classification. The different document may be a new document or a document that intake device 115 received previously. As an example, intake device 115 may receive the different document for classification via email. Alternatively, intake device 115 may receive the different document as a bulk intake of documents received in a batch of documents. The different document may be provided in various formats, such as MICROSOFT WORD documents, MICROSOFT EXCEL documents, png, jpg, raw, gif, tiff, PDFs, txt files, handwritten notes, XIVIL, emails, HTML, scanned documents, or the like. A different document may also be a combination of multiple formats. For example, the different document may be in .doc format; however, it may also include an embedded JPEG image. In another example, a portion of the different document may be an email message as while another portion may be in a .doc format.

Decision engine 116 may determine whether the different document needs to be classified. For example, decision engine 116 may electronically scan the different document to determine the document's content. In the event, decision engine 116 may identify a majority of the different document's content, decision engine 116 may determine that the document does not need to be classified. Decision engine 116 may be able to assign the classifications of the documents on its own. In the event, decision engine 116 cannot identify a threshold amount of the content of the different document, decision engine 116 may determine the different document needs to be classified. Decision engine 116 may transmit request 202-1 to client device 110 for classifying the different document. Decision engine 116 may store the different document in database 120. Request 202-1 may also include parameters associated with the different document. The parameters may include the sender of the different document, date and time of receipt of the different document, an urgency level of the different document, or the like. The parameters may also include any characteristics about the different document, such as redactions, watermarks, other markings, or the like.

Classification application 114 may receive request 202-1 and may transmit request 202-2 to server 100 for classifying a different document using the now trained first, second, and third learning models 104-108. In some embodiments, classification application 114 may hold or store request 202-2 in an inbox of a mail or messaging application. Request 202-2 may include the document to be classified.

Server 100 may receive request 202-2. Request 202-2 may include query 202-3 for retrieving the different document from database 120. Request 202-2 may also include the parameters of the different document. Conversion engine 103 may transmit query 202-3 to database 120. Database 120 may transmit response 202-4 to server 100. Response 202-4 may include the different document.

In some embodiments, script 109 may periodically poll the inbox of the mail or messaging application included in classification application 114. Script 109 may retrieve request 202-2 and the different document included in request 202-2. Script 109 may determine whether the different document is in a predetermined format (e.g., a PDF format). In the event that the different document is not in the predetermined format, script 109 may convert the different document into the predetermined format. Script 109 may forward the different document to conversion engine 103.

Conversion engine 103 may confirm that the different document is in PDF format. In the event the different document is not in PDF format, conversion engine 103 may convert the different document into PDF format. Conversion engine 103 may convert the different document into an image file. In some embodiments, conversion engine 103 may convert the different document into an image file even if the different document is not in a PDF format. Furthermore, conversion engine 103 may blend all the pages of the image file into a single image stack. In the event an image file includes a single page, conversion engine 103 may convert the single page into a white-scale or grayscale image. The single image stack may include a white-scale or grayscale image representation of the single page of the corresponding document. In other embodiments, conversion engine 103 may convert the single page into a different scale, and a single image stack for the single page may include a scaled image representation of the single page of the corresponding document. In the event the image file includes multiple pages, the single image stack for the document may include a composite of all the pages of the image file as a single JPEG image. The image file may include the single image stack. Conversion engine 103 transmit the image file to the learning engine including a request to classify the different document using the image file.

API 102 may receive the image file and the request to classify the document using the image file. API 102 may forward the different document and request to classify the document using the image file to first, second, and third learning models 104-108. In response to receiving the image file and the request, first, second, and third learning models 104-108 may use the trained CNN algorithm, respective to the learning model, to identify a first, second, and third attribute associated with the image file, respectively. The trained CNN learning model for each first, second, and third learning model 104-108 may take into account the parameters of the image files, including any redactions, watermarks, or other markings. The CNN algorithm may use image analysis to identify the first, second, and third attributes associated with the image file. First, second, and third learning models 104-108 may assign a first, second, and third classification to the different document based on the first, second, and third attributes, respectively. First, second, and third learning models 104¬108 may also assign a confidence score to the respective classification. The confidence score indicates the likely accuracy of the respective classification. As indicated above, the CNN algorithm will be described in further detail with respect to FIG. 3.

Learning engine 101 may use the first, second, and third classification for the different document to generate a priority value. The priority value may indicate whether the document needs to be brought to someone's attention. For example, a higher priority value may indicate a need for a quicker response for the document. Learning engine 101 may also use elements such as productivity, capacity, and demand. For example, learning engine 101 may identify documents that have already been classified that are awaiting action. Learning engine 101 may compare the classifications of the documents that have been classified and are awaiting action to the first, second, and third classification of the different document. The first classification corresponds to the validity of the different document. The second classification corresponds to an indicator of the seriousness of the content on the different document. The third classification corresponds to one or more elements corresponding to the seriousness of the content.

Furthermore, learning engine 101 may also identify the parameters associated with the different document. For example, learning engine 101 may determine the sender of the different document, the time the different document was received, and an urgency value associated with the different document. Learning engine 101 may also determine the productivity, capacity, and demand elements associated with human or agent resources processing the documents that have already been classified. Learning engine 101 may use the first, second, and third classifications of already classified documents that are awaiting action, first, second, and third classifications of the different document, the parameters of the different document, and the productivity, capacity, and demand of the human resources processing the documents, to determine a priority value for the different document. The priority value may indicate a position in a queue for when the different document needs to be processed. The priority value may also indicate a need for more human or agent resources due to the high volume of documents that need to be processed.

Learning engine 101 may transmit response 202-5 to client device 110. Response 202-5 may include the first, second, and third classification of the different document and the priority value. Classification application 114 may cause display of the first, second, and third classification on a display of client device 110. The outputs for first, second, and third classifications may be represented as: a label, a percentage, a numerical range, or the like. A label may be a binary or other classification. The percentage or numerical range may indicate a value associated with the document with respect to the respective classification. Response 202-5 may include the first, second, and third classification and the priority value. Learning engine 101 may also store the assigned classifications as metadata for the different document in database 120. The metadata may be used to update and optimize first, second, and third learning models 104-108.

In some embodiments, a user of client device 110 may approve or reject the priority value, first classification, second classification, and third classification included in response 202-5, using classification application 114, based on the user's understanding of the different document. The approval or rejection of the priority value, first classification, second classification, and third classification may be transmitted to server 100. Learning engine 101 may update and optimize first, second, and third learning models 104-108 with the approval or rejection. First, second, and third learning models 104-108 may optimize the respective CNN algorithm based on the approval or rejection. For example, first, second, and third learning models 104-108 may better understand how to classify documents based on approval or rejection. In this regard, first, second, and third learning models 104-108 may continuously be updated when classifying each different document. For example, client device 110, server 100, learning engine 101, or database 120 may store the user feedback for future optimizations of the learning models.

As a non-limiting example, the above-described system for classifying documents using image analysis may be used to classify PV documents. PV documents may include ICSR documents (e.g., literature articles and clinical reports). Furthermore, PV documents include information about the patient, geography, adverse effects, ICSR quality & compliance characteristics, benefit-risk characteristic, product details, study details, consumer complaints, legal concepts, or other medical concepts associated with the use of the FDA regulated products. Companies in the pharmaceutical space may need to process the PV documents to determine whether any action is needed for a particular product.

The PV workflow may include three process blocks: case intake, case processing, and case reporting. Upon intake, PV departments globally receive PV documents from different sources in various formats and languages. Reports come from different reporters, healthcare professionals, nonhealthcare professionals, and various mediums, such as via email, fax, mail, and phone. Several important assessments are made upon case intake, which are critical in routing cases given their severity, to meet pre-defined regulatory guidelines.

Compliance with regulatory authorities is determined based on report ability to country-specific regulatory authorities within respective specified timelines. Therefore, upfront prioritization should be accurate to limit the propagation of work effort being performed on less urgent reports. Assessment for prioritization may include the following key characteristics: case validity (valid or non-valid), case seriousness (serious or non-serious), relatedness (related or non-related to the suspect product), and an SRE of an adverse effect (labeled or unlabeled). Case validity may indicate whether the PV document is a valid document. Case seriousness may indicate whether an adverse effect listed in the PV document is serious or non-serious. SRE may indicate whether an adverse effect is a serious, related, and expected (e.g., labeled on the product) effect.

A company may need to take action with regard to a specific product if an adverse effect listed in a valid PV document is serious and unexpected. As a result, first learning model 104 may be trained to classify a given PV document as valid or non-valid. Second learning model 106 may be trained to classify the given PV document based on a seriousness of an adverse effect listed on the PV document. Third learning model 108 may be trained to classify the given PV document based on seriousness, relatedness, or expectedness (SRE) of an adverse effect.

First learning model 104 may assign a binary value (valid or non-valid). Second and third learning models 106-108 may assign percentages or numerical ranges. For example, second learning model 106 may assign a numerical range or percentage indicating the seriousness of an adverse effect. Third learning model 108 may assign a numerical range or percentage associated with the SRE of an adverse effect listed on the PV document.

Learning engine 101 may use a combination of the binary classification of valid or non-valid, a numerical range or percentage indicating the seriousness of an adverse effect, and a numerical range or percentage associated with the SRE of an adverse effect listed on the PV document to generate a priority value. Furthermore, learning engine 101 may also use processing information such as productivity, capacity, and demand to determine the priority value. The priority value may indicate that a case corresponding to the PV document needs to be acted on based on a predetermined timeline. For example, as indicated above, compliance with regulatory authorities is determined based on report ability to country-specific regulatory authorities within the respective specified timelines. PV documents that indicate serious and valid adverse effects of a product may need to be reported or acted upon within a predetermined timeline.

Training application 112 may transmit request 204-1 to train first, second, and third learning models 104-108. This may include a query 204-2 to retrieve a set of PV documents and their corresponding metadata. The corresponding metadata may include the classification of validity, seriousness, or SRE of an adverse effect. The classifications may be assigned by an S1VIE or third party. For example, the training set of PV documents may include approximately 500,000 ICSR documents, of which approximately 80% are used for model training, and approximately 20% are used for model validation.

Conversion engine 103 may transmit query 204-2 to database 120 to retrieve the set of ICSR documents and the corresponding metadata. Database 120 may return response 204-3 to server 100. Response 204-3 may include the set of ICSR documents and corresponding metadata. Conversion engine 103 may identify the formats of each of the ICSR documents. In the event the IC SR is not in an image format, conversion engine 103 may convert the format of the ICSR document into an image file. In some embodiments, documents undergo an intermediate step of PDF conversion prior to image conversion. In such embodiments, in the event the ICSR is not in a PDF format, conversion engine 103 may convert the format of the ICSR document into a PDF format.

Conversion engine 103 may then convert each ICSR document into an image file, resulting in a set of image files. As indicated above, conversion engine 103 may convert a given document into an image file, even if the given document is not in a PDF format. Conversion engine 103 may generate a single image stack for each image file. The single image stack for each image file may include a composite of the pages of the corresponding image file. Each image file may include the corresponding single image stack. Conversion engine 103 may provide the set of image files as an input parameter to learning engine 101. Conversion engine 103 may also provide the parameters of each image file to the learning engine 101. The parameters may include a sender of a document (corresponding to an image file), date and time of receipt of the document, an urgency level associated with the document, or the like. The parameters may also include characteristics about each image file, including redactions, watermarks, other markings, or the like.

Learning engine 101 may use the set of image files to train first, second, and third learning models 104, 106, and 108 to assign a first, second, and third classification, respectively, to each of the IC SR documents corresponding to the set of image files. First, second, and third learning models 104-108 may use CNN algorithms to assign the first, second, and third classifications. The CNN algorithms can perform image analysis on each image file to assign the first, second, and third classifications. Furthermore, CNN algorithms may take into account the parameters of each image file, such as redactions, watermarks, markings, or the like, when performing the image analysis.

First learning model 104 may use the CNN algorithm to identify one or more attributes associated with a given image file corresponding to a given ICSR document indicating validity. First learning model 104 may use the identified attribute(s) to classify the given IC SR document as valid or non-valid. First learning model 104 may assign the classification of valid or non-valid for each ICSR document corresponding to the set of image files. First learning model 104 may validate the classification of valid or non-valid based for a subset of ICSR documents, using the metadata corresponding to the ICSR documents. First learning model 104 may generate validation results. The validation results may indicate whether first learning model 104 accurately assigned the classification to the ICSR document.

Second learning model 106 may use the CNN algorithm to identify one or more attributes associated with a given image file corresponding to a given ICSR document indicating seriousness. As a non-limiting example, the CNN algorithm may identify pixel intensity associated with the given ICSR document by performing image analysis on the corresponding image file. For example, second learning model 106 may determine that ICSR documents that include serious adverse effects may correspond with image files with higher pixel intensity. Second learning model 106 may use the identified attribute(s) to classify the given IC SR document as serious or non-serious. Second learning model 106 may assign the classification of seriousness for each ICSR document corresponding to the set of image files. The classification may be binary or of a numerical range or percentage indicating the seriousness of the adverse effect listed in a given ICSR document. Second learning model 106 may validate the classification of serious or non-serious for a subset of ICSR documents, using the metadata corresponding to the ICSR documents. Second learning model 106 may generate validation results. The validation results may indicate whether second learning model 106 accurately assigned the classification to the ICSR document.

Table 1 includes example experimental results when training second learning model 104 to assign a seriousness classification to ICSR documents and the pixel densities of the respective image files.

TABLE 1

| Density Stats | S | Non- |
|---|---|---|
| count | 15 | 150755 |
| mean | 19 | 207 |
| std | 32 | 26 |
| min | 12 | 12 |
| 25% quantile | 18 | 202 |
| 50% quantile | 20 | 216 |
| 75% quantile | 21 | 224 |
| max | 24 | 239 |

On average, "Serious" cases tend to be more "Black" (mean density=195) as compared to "Non-Serious" Cases (mean density=207). Furthermore, in 25%, 50%, and 75% quantiles, there is a similar increase of "Black" pixels for "Serious" cases as compared to "Non-Serious" cases.

Third learning model 108 may use the CNN algorithm to identify one or more attributes associated with a given image file corresponding to a given ICSR document indicating an SRE of an adverse effect. Third learning model 108 may use the one or more attributes to assign a classification associated with the SRE of an adverse effect listed on the given ICSR document. Third learning model 108 may assign the classification associated with the SRE of an adverse effect listed in each ICSR document corresponding to the set of image files. Third learning model 108 may validate the classification associated with the SRE of an adverse effect listed in a given ICSR document for a subset of ICSR documents, using the metadata corresponding to the ICSR documents. Third learning model 108 may generate validation results. The validation results may indicate whether third learning model 108 accurately assigned the classification associated with the SRE of an adverse effect included in the ICSR document.

First, second, and third learning models 104-108 may use the validation results to optimize the CNN algorithm for the respective learning model (first, second, and third) and re-execute the identification, classification, and validation steps. First, second, and third learning models 104-108 may generate validation results after each iteration of the identification, classification, and validation steps. Furthermore, first, second, and third learning models 104-108 may optimize the CNN algorithm(s) after each iteration of the identification, classification, and validation steps. First, second, and third learning models 104-108 may re-execute the identification, classification, and validation steps a predetermined number of iterations. Alternatively, first, second, and third learning models 104-108 may re-execute the identification, classification, and validation steps until a desired level of accuracy of assigning classifications to the documents is achieved.

Once the identification, classification, and validation steps have been re-executed, a predetermined number of iterations or the desired accuracy in classifying documents has been achieved, first, second, and third learning models 104-108 may be considered completely trained. Once the CNN algorithms for the first, second, and third learning models 104-108 are completely trained, learning engine 101 may transmit response 204-4 to client device 110. Response 204-4 may indicate that the CNN algorithms for the first, second, and third learning models 104-108 are completely trained.

Once the CNN algorithms have been trained, intake device 115 may receive a different PV document for classification. The different PV document may be a different ICSR document. Decision engine 116 may determine whether the different ICSR document needs to be classified. For example, decision engine 116 may electronically scan the different ICSR document to determine the content of the different ICSR document. In the event, decision engine 116 may identify a majority of the content of the different ICSR document, decision engine 116 may determine that the ICSR document does not need to be classified. In the event decision engine 116 cannot identify a threshold amount of the different document's content, decision engine 116 may determine the different ICSR document needs to be classified. Decision engine 116 may transmit request 206-1 to client device 110 for classifying the different ICSR document. Decision engine 116 may store the different document in database 120. Request 206-1 may also include parameters associated with the different ICSR document. The parameters may include the sender of the different ICSR document, the date and time of receipt of the different ICSR document, an urgency level of the different ICSR document, or the like. The parameters may also include any characteristics about the different ICSR document, such as redactions, watermarks, other markings, or the like.

Classification application 114 may receive request 206-1 and transmit request 206-2 to server 100 to classify a different ICSR document. The different ICSR document may be an ICSR document not included in the training set of ICSR documents. Request 206-2 may include a query 206-3 to retrieve the different ICSR document from database 120.

In some embodiments, classification application 114 may hold or store request 206-2 in an inbox of a mail or messaging application. Request 206-2 may include the different ICSR document to be classified.

Server 100 may receive request 206-2, and conversion engine 103 may transmit query 206-3 to database 120 to retrieve the different ICSR document. In some embodiments, script 109 may periodically poll the inbox of the mail or messaging application included in classification application 114. Script 109 may retrieve request 206-2 and the different ICSR document included in request 206-2. Script 109 may determine whether the different ICSR document is in a predetermined format (e.g., a PDF format). If the different ICSR document is not in a predetermined format, script 109 may convert the different ICSR document into the predetermined format. Script 109 may forward the different ICSR document to conversion engine 103.

Conversion engine 103 may confirm that the different ICSR document is in PDF format. In the event the different ICSR document is not in PDF format, conversion engine 103 may convert the different ICSR document into PDF format. As indicated above, conversion engine 103 may also generate an image file of the different ICSR document even when the different ICSR document is not in a PDF format. Conversion engine 103 may also generate a single image stack of the image file. The single image stack may include a composite of all the pages of the image file. The image file may include the single image stack. Conversion engine 103 may transmit the image file to the learning engine 101 along with the parameters of the image file.

API 102 may receive the image file and the request to classify the different ICSR document. API 102 may forward the image file to first, second, and third learning models 104-108 to respectively assign a first, second, and third classification to the different ICSR document, serially or in parallel. First, second, and third learning models 104-108 may use the CNN algorithm to identify one or more attribute(s) associated with the image file corresponding to the different ICSR document. The CNN algorithm may perform image analysis on the image file to identify the one or more attributes associated with the image file. Moreover, the CNN algorithm may take into account the parameters of the image file, including redactions, watermarks, or markings, when performing the image analysis.

In a particular embodiment, the CNN algorithm implemented by first learning model 104 may identify one or more attributes indicative of the validity of the different ICSR document. First, second, and third learning 104-108 may assign a first, second, and third classification, respectively. The first classification corresponds to the validity of the different document. The second classification corresponds to an indicator of the seriousness of the content on the different document. The third classification corresponds to one or more elements corresponding to the seriousness of the content.

More specifically, first learning model 104 may assign a classification of valid or non-valid to the different IC SR document based on the identified attribute(s). The CNN algorithm implemented by second learning model 106 may identify one or more attributes of the image file that indicate seriousness. Second learning model 106 may assign a classification indicating the seriousness of an adverse effect listed in the different ICSR document, based on the identified attribute(s). As a non-limiting example, the seriousness may be correlated to health risk. The higher the health risk, the higher the seriousness. Conversely, the lower the health risk, the lower the seriousness. The CNN algorithm implemented by third learning model 108 may identify one or more attributes indicative of an SRE of an adverse effect included in the different ICSR document. Third learning model 108 may assign a classification associated with the SRE of an adverse effect included in the ICSR document, based on the identified attribute(s).

Learning engine 101 may generate an output, including the assigned classifications to the ICSR document. Learning engine 101 may also output a confidence score indicating a likely accuracy of the first, second, and third classification. Learning engine 101 may use the assigned classifications to generate a priority value (e.g., high, medium, low) of the ICSR document. The priority value may indicate a timeline in which action needs to be taken for the ICSR document. Learning engine 101 may also use elements such as productivity, capacity, and demand.

For example, learning engine 101 may identify ICSR documents that have already been classified that are awaiting action. Learning engine 101 may compare the classifications of the ICSR documents that have been classified and are awaiting action to the first, second, and third classification of the different ICSR document. Furthermore, learning engine 101 may also identify the parameters associated with the different document. For example, learning engine 101 may determine the sender of the different ICSR document, the time the different ICSR document was received, and an urgency value associated with the different document. This may identify a particular regulatory agency, the different ICSR document is associated with, or if the ICSR document is part of a clinical trial. Learning engine 101 may also determine the productivity, capacity, and demand elements associated with human resources processing the ICSR documents that have already been classified. Learning engine 101 may use the first, second, and third classifications of already classified ICSR documents that are awaiting action, first, second, and third classifications of the different ICSR document, the parameters of the different ICSR document, and the productivity, capacity, and demand of the human resources processing the ICSR documents, to determine a priority value for the different ICSR document. The priority value may indicate a position in a queue for when the different ICSR document needs to be processed. The priority value may also indicate a need for more human resources due to the high demand of ICSR documents that need to be processed.

The priority value may be included in the output. Learning engine 101 may include the output in response 206-5 and transmit response 206-5 to client device 110. Training application 112 may render the output on the display of client device 110. Learning engine 101 may also store the assigned classifications as metadata for the ICSR document in database 120.

In some embodiments, learning engine 101 may serially classify the ICSR document using first, second, and third classification learning models 104-108. That is, learning engine 101 may initially instruct first learning model 104 to classify the ICSR document to determine whether the document is a valid document. In response to determining that the ICSR document is valid, learning engine 101 may instruct second learning model 106 to determine whether the adverse effect listed in the ICSR document is serious or non-serious. Alternatively, in response to determining that the ICSR document is not valid, learning engine 101 may generate the output indicating that the ICSR is not valid. Furthermore, the output may include the confidence score indicating the accuracy of the classification that the ICSR document is non-valid and transmit the output to client device 110, without instructing second or third learning models 106-108 to classify the ICSR document.

In response to second learning model 106 classifying the adverse effect listed in the ICSR document as serious, learning engine 101 may instruct third learning engine 108 to assign a classification associated with the SRE of an adverse effect included in the ICSR document. Alternatively, in response to determining that the adverse effect in the ICSR document is not serious, learning engine 101 may generate the output indicating that the adverse effect in the ICSR document is not serious, and transmit the output to client device 110, without instructing third learning model 108 to classify the ICSR document. The output may also include a confidence score indicating the likely accuracy that the adverse effect in the ICSR document is not serious.

The system for classifying documents using image analysis may also be used in other fields such as the legal field, business, finance, medical, insurance, educational institutions, or the like. For example, the system may be used to classify legal documents in the field of e-discovery. Moreover, the system may be used to classify business documents such as invoices, purchase orders, orders, or the like.

The system for classifying documents using image analysis may be used in other fields by training the respective learning model to identify certain features of documents in the respective field. For example, a learning model may be trained to identify features of documents by converting a set of documents (of a particular field such as e-discovery, retail, business, insurance, energy, transportation & logistics, healthcare, or the like) into a set of single image stack and training the learning model using a set of single image stacks. The features may be used to identify an attribute of the document so that the system may appropriately classify the document.

For example, in the field of e-discovery, the system to classify documents using image analysis may be used to classify documents as privileged or non-privileged by training a learning model to identify features of privileged documents based on image files corresponding to such documents.

Figure 2B:
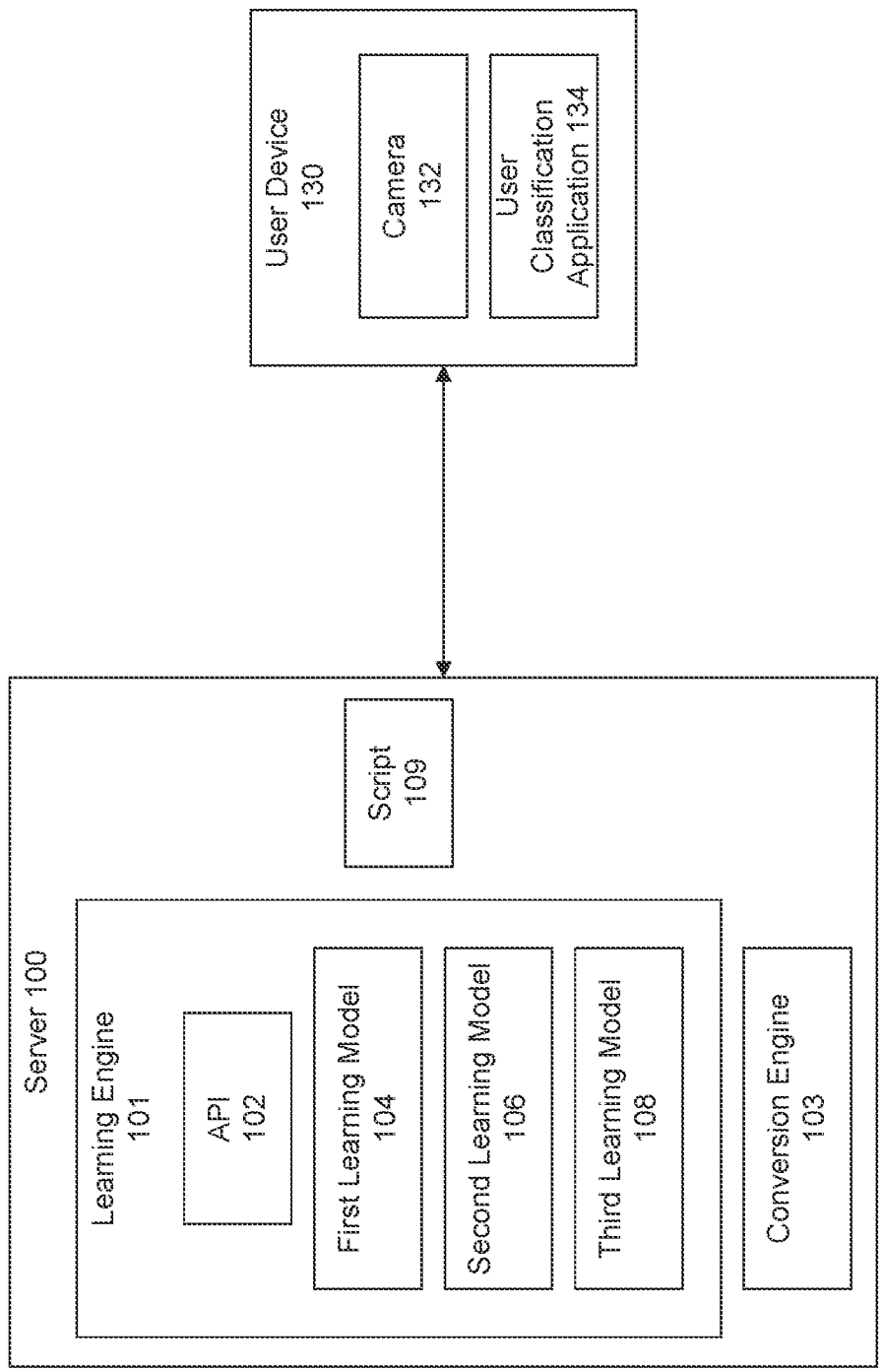
FIG. 2B is a block diagram illustrating a user device classifying a document, according to example embodiments.

FIG. 2B is a block diagram illustrating a user device classifying a document according to exemplary embodiments. In an embodiment, a user may launch user classification application 134 to classify a document. User classification application 134 may implement a fully trained learning engine to classify documents. User classification application 134 may include a learning engine that is trained to assign classifications to documents like first, second, and third learning models 104-108. More specifically, user classification application 134 may include a learning engine to classify documents using CNN in a particular field (e.g., medical, regulatory, legal, etc.).

Launching user classification application 134 may cause camera 132 to become operational. The user may use camera 132 to capture an image of the document. In some embodiments, a user may use user classification application 134 to upload a document from an email, local memory, external memory coupled to user device 130, etc. In some embodiments, user classification application 134 may be connected to the Internet of Things (IoT) devices such as smartwatches, sensors, appliances, computing devices, or the like. User classification application 134 may receive documents from the IoT devices.

User classification application 134 may convert the image of the document into an image file including a single stack image, as described above with respect to conversion engine 103. Alternatively, user classification application 134 may determine whether an uploaded document is an image file or a PDF. In the event that the uploaded document is not an image file or PDF, user classification application 134 may convert the uploaded document into an image file. Furthermore, user classification application 134 may convert the image file into an image file, including a single stack image, as described above with respect to conversion engine 103.

For example, user classification application 134 may be configured to assign a classification to the document using the image file, as described above with respect to FIG. 2. User classification application 134 may generate an output including the first, second, and third classification, a priority assigned to the document based on the first, second, and third classification, and a confidence score. The confidence score indicates a likely accuracy of the classification.

As a non-limiting example, a user may interact with user classification application 134 to classify a medical document. The medical document may be but is not limited to: a lab report, EKG report, genomic report, blood work lab report, etc. User classification application 134 may use CNN to assign a classification indicating the seriousness of the content of the medical document. User classification application 134 may also determine whether the user should consult a medical professional based on the seriousness of the content of the medical document. User classification application 134 may generate an output including the classification, a recommendation of whether the user should consult a medical professional, and a confidence score. The confidence score indicates a likely accuracy of the classification. User classification application 134 may cause display the classification and determination of whether the user should consult a medical professional on user device 130.

User classification application 134 may generate the classification and determine whether the user should consult a medical professional locally on user device 130. Furthermore, user classification application 134 may generate the classification and determine whether the user should consult a medical professional without identifying or extracting any Personally Identifiable Information (PII) from the document. This reduces any security risks involved with divulging PII (e.g., phishing, hacking, cyber-attacks, etc.).

For example, the document may be an EKG report. Therefore, the user may identify the seriousness of the EKG report based on the classification assigned by user classification application 134 without transmitting or divulging PIT.

In some embodiments, user classification application 134 may transmit the document or the image file, including the single image stack of the document, to server 100 for classification. First, second, or third learning models 104-108 may classify the document using the image file.

Figure 3:
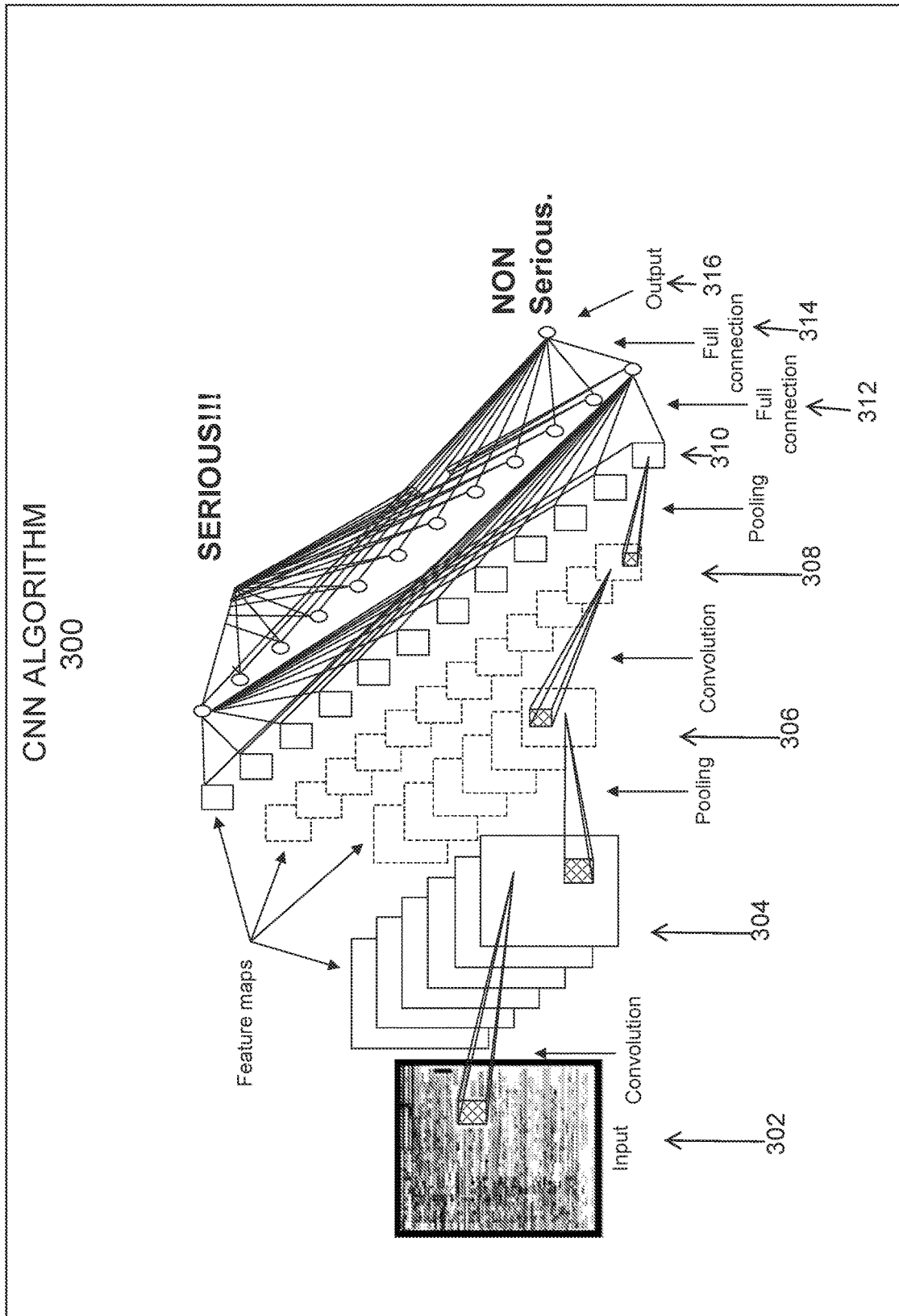
FIG. 3 is a block diagram of an example of a learning model implementing a CNN algorithm, according to example embodiments.

FIG. 3 is a block diagram of an example of a learning model implementing a CNN algorithm, according to example embodiments. FIG. 3 will be described in reference to FIGS. 1-2.

As described above, first, second, and third learning models 104-108 may implement a supervised deep-learning algorithm such as CNN to classify documents based on their corresponding image files. CNN algorithm 300 may be trained to classify the documents. Each of first, second, and third learning models 104-108 may implement a different embodiment of CNN algorithm 300.

CNN algorithm 300 may be trained in two phases, a forward phase, and a backward phase. The forward phase includes convolution layers 304 and 308, pooling layers 306 and 310, and fully connected layers 312 and 314. Convolution layers 304 and 308 may apply filters to an input image file 302 to generate a feature map. Pooling layers 306 and 310 may generate a reduced feature map. Fully connected layers 312 and 314 may then classify the features of the image using weights and biases to generate output 316. Output 316 may be a classification of input image file 302. The values of the filters, weights, and biases may be parameters received by CNN algorithm 300 (e.g., from client device 110).

In the backward phase, CNN algorithm 300 may use backpropagation to determine whether the CNN algorithm was able to classify the image correctly. Then, the CNN algorithm may update the values for the filters, weights, and biases using a gradient descent algorithm and re-execute the forward phase on input image file 302. As such, the CNN algorithm may be trained to classify input image file 302 using feature learning and classification.

As an example, CNN algorithm 300 may be trained using a set of image files, including input image file 302. Input image file 302 may correspond to a document containing alphanumeric text. Input image file 302 may include an image representation of the document. Furthermore, input image file 302 may be a composite of all the pages of the document. As a non-limiting example, input image file 302 may have a size of 160×160 pixels, making it a 160×160 dimensioned array. The 160×160 dimensioned array may be flattened into a 25600-dimensional vector. Each component of the vector may include a value between 0 and 1. The value may describe the intensity of the pixel. Input image file 302 may include a unique JPEG "fingerprint" in grayscale format.

In convolution layer 304, CNN algorithm 300 may execute feature extraction on input image file 302. The features may include portions of input image file 302. For example, the features may be different edges or shapes of input image file 302. CNN algorithm may extract different types of features to generate different types of feature maps. For example, CNN algorithm 300 may apply an array of numbers (e.g., kernel) across the different portions of input image file 302. The kernel may also be referred to as a filter. As indicated above, different types of filters may be applied to input image file 302 to generate different feature maps. For example, the filter for identifying a shape in input image file 302 may be different from the filter for edge detection. Therefore, different kernels may be applied for identifying a shape in input image file 302 as compared to edge detection. Each kernel may include a different array of numbers. The values of the filters or kernels may be randomly assigned and optimized over time (e.g., using a gradient descent algorithm). The kernel may be applied as a sliding window across different portions of input image file 302. The kernel may be summed with a given portion of input image file 302 to generate an output value. The output value may be included in a feature map. The feature maps may include an output value from the different kernels applied to each portion of input image file 302. The generated feature maps may be a two-dimensional array.

In pooling layer 306, CNN algorithm 300 may reduce the dimensionality of each feature map generated in convolution layer 304. In particular, CNN algorithm 300 may extract portions of a given feature map and discard the rest. Pooling the image keeps the important features. For example, a feature map may include activated areas and non-activated areas. Activated areas may include detected features, while non-activated areas may indicate that the portion of the image did not include a feature. Pooling may remove the non-activated areas. This way, the size of the image is reduced. CNN algorithm 300 may use max or average pooling in the pooling layer to perform these operations. Max pooling keeps the higher values of portions of the feature map while discarding the remaining values. Average pooling keeps the average value of different portions of the feature map. Therefore, CNN algorithm 300 may generate a reduced feature map for each of the feature maps generated in convolution layer 304.

In convolution layer 308, CNN algorithm 300 may generate additional feature maps based on the reduced feature maps generated in pooling layer 306. Furthermore, in pooling layer 310, CNN algorithm 300 may generate further reduced feature maps based on the feature maps generated in convolution layer 308. Multiple different convolution layers and pooling layers may be added to CNN algorithm 300.

Convolution layers 304 and 308 may also apply a Rectified Linear Unit (ReLU) function to input image file 302. The ReLU function is applied to input image file 302 to remove the linearity from input image file 302. For example, the ReLU function may remove all the black elements from input image 302 and keep only the grey and white colors. This causes the color to change more abruptly in input image 302, which removes the linearity from input image 302.

Convolution layers 304 and 308 and pooling layers 306 and 310 may be used for feature learning. Feature learning allows CNN algorithm 300 to identify desired features in input image file 302 and accurately classify input image file 302. Therefore, by optimizing convolution layers 304 and 308 and pooling layers 306 and 310, CNN algorithm 300 may apply the correct filters on input image file 302 to extract the necessary features needed to classify input image file 302.

In fully connected layer 312, CNN algorithm 300 may flatten the reduced feature maps generated in pooling layer 310 into a one-dimensional array (or vector). The fully connected layer is a neural network. CNN algorithm 300 may execute a linear transformation on the one-dimensional array in fully connected layer 312. CNN algorithm 300 may perform the linear transformation by applying weights and biases to the one-dimensional array to generate fully connected layer 314. Initially, the weights and biases are randomly initialized and may be optimized over time.

In fully connected layer 314, CNN algorithm 300 may perform a non-linear transformation such as an activation layer function (e.g., softmax or sigmoid) to classify input image file 302. CNN algorithm 300 may use the classification of input image file 302 to classify the corresponding document.

CNN algorithm 300 may use backpropagation to validate its classification of input image file 302. As described in FIG. 2, in a training mode, CNN algorithm 300 may receive the image file and metadata of the corresponding document. The metadata may include a classification assigned to the document. CNN algorithm 300 may compare the classification assigned to the document by CNN algorithm 300 with the classification included in the document's metadata. If the classification assigned to the document by CNN algorithm 300 matches the classification included in the document's metadata, CNN algorithm 300 may determine that CNN algorithm 300 correctly assigned the classification to the document. Alternatively, if the classification assigned to the document by CNN algorithm 300 does not match the classification included in the document's metadata, CNN algorithm 300 may determine that it incorrectly assigned the classification to the document.

Backpropagation may also include optimizing the input parameters, such that CNN algorithm 300 may more accurately classify documents. The input parameters may include values for the kernels, weights, biases, or the like. Gradient descent may be used to optimize the parameters. In particular, gradient descent may be used to optimize CNN algorithm's 300 classification of the document.

Gradient descent is an iterative process to optimize CNN algorithm 300. Gradient descent may update the parameters of CNN algorithm 300, and cause CNN algorithm 300 to classify input image file 302 and the other image files in the set of image files based on the updated parameters, and validate the classifications of a subset of image files. After each iteration of CNN algorithm 300 classifying the set of image files and validating the subset of the set of image files, the parameters may be further updated (or optimized). Each iteration of CNN algorithm 300 classifying the set of image files and validating the subset of the set of image files may be referred to as an epoch. CNN algorithm 300 may execute a predetermined number of epochs to be considered completely trained. The predetermined number of epochs may be selected based on the accuracy of CNN algorithm 300 when classifying the image files (or documents).

Once CNN algorithm 300 is fully trained, CNN algorithm 300 may classify a different image file, which is not included in the training set of image files. For example, CNN algorithm 300 may receive a different image file as an input. CNN algorithm 300 may execute convolution layers 304 and 308, pooling layers 306 and 310, and fully connected layers 312 and 314 on the different image file to classify the different image file.

As a non-limiting example, CNN algorithm 300 may be used to classify ICSR documents. CNN algorithm 300 may be implemented by first, second, and third learning models 104-108 to assign classifications associated with validity, seriousness, and SRE to a given ICSR document.

As indicated above, first, second, and third learning models 104-108 may implement different embodiments of CNN algorithm 300. For example, first learning model 104 may use a first set of parameters to train CNN algorithm 300 to classify a given ICSR document based on validity. The parameters may be filters, weights, biases, or the like. Furthermore, second learning model 106 may use a second set of parameters to train CNN algorithm 300 to classify a given ICSR document based on the seriousness of the adverse effect listed in the ICSR document.

CNN algorithm 300 may use feature learning to identify particular features of valid documents as compared to non-valid documents. Similarly, CNN algorithm 300 may use feature learning to identify particular features of documents listing serious adverse effects as compared to documents listing non-serious adverse effects. Moreover, CNN algorithm 300 may use feature learning to identify particular features of documents, including an SRE of an adverse effect.

As indicated above, CNN algorithm 300 may execute a predetermined number of epochs to be considered completely trained. A user (e.g., developer) can determine that the CNN algorithm is completely trained based on an F-1 score and an Area Under the Curve (AUC) score of CNN algorithm 300. The F-1 score and Area Under the Curve (AUC) curve may indicate the accuracy of the classifications assigned by CNN algorithm 300.

The following are example experimental results for when identifying accuracy of the classifications of the CNN algorithm after a given amount of epochs:

Following 25 epochs of training CNN algorithm 300 to assign a classification associated with validity, CNN algorithm 300 achieved an F-1 score of 96% and AUC of 0.99 when compared against the actual classifications of the ICSR documents.

Following 30 epochs of training CNN algorithm 300 to assign a classification associated with seriousness, CNN algorithm 300 achieved an F-1 score of 81% and AUC of 0.90 when compared against the actual classifications of the ICSR documents.

Following 25 epochs of training CNN algorithm 300 to assign a classification associated with the SRE of an adverse event, the CNN algorithm 300 achieved an F-1 score of 78% and AUC of 0.87 when compared against the actual classifications of the ICSR documents.

Figure 4:
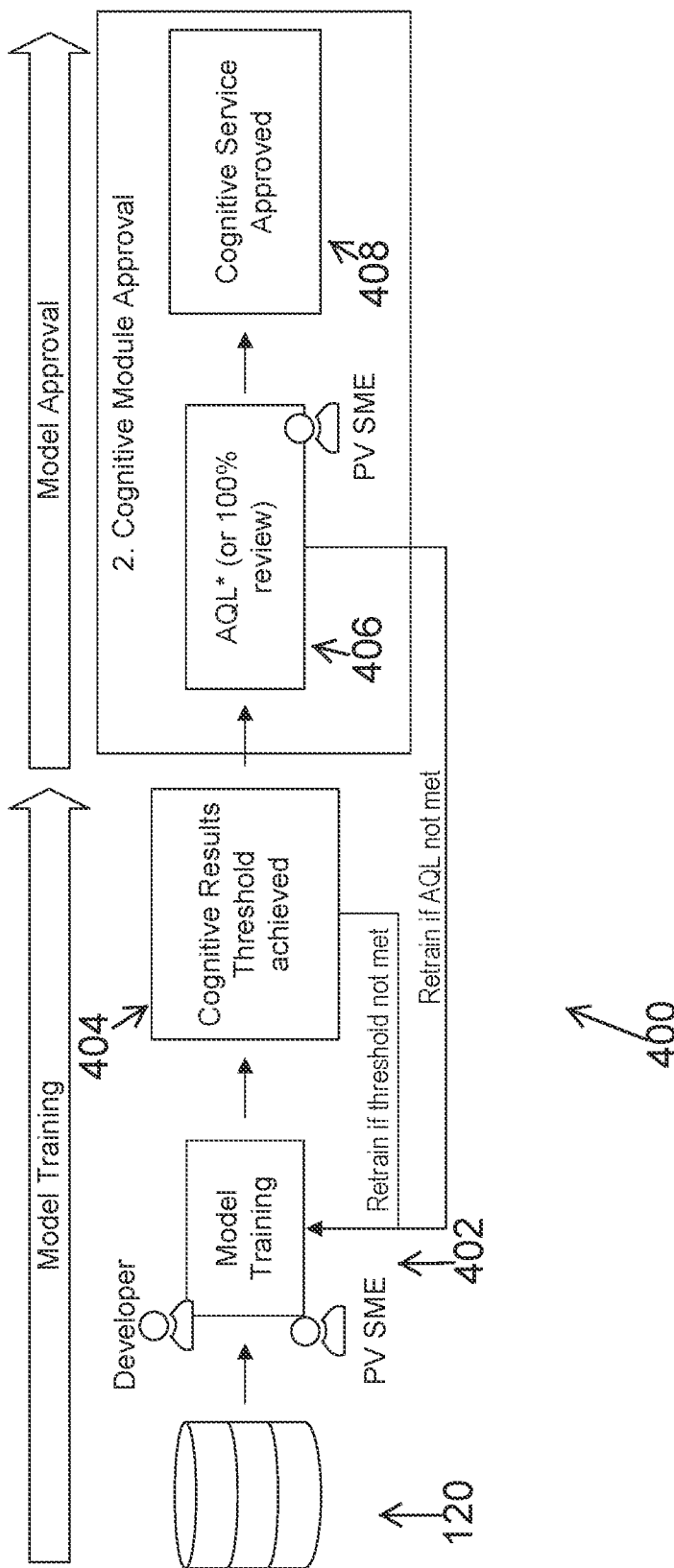
FIG. 4 is a block diagram of a model approval flow, according to example embodiments.

FIG. 4 is a block diagram of a model approval flow, according to an example embodiment. Model approval flow 400 may be used to determine whether a learning model is classifying documents at an acceptable level of accuracy. In operation 402, a Subject Matter Expert (SME) or developer transmits a request to train a learning model using a set of documents from database 120. The learning model may implement the CNN algorithm. Therefore, the learning model may be trained to classify documents using image representations of the set of documents, as described above. Training the learning model may include recursively classifying each document of the set of documents and validating classifications of each of a subset of the documents against the metadata for each document. The subset of the documents may be 10% of the set of documents.

In operation 404, the learning model may determine whether the accuracy of the learning model's classification meets a threshold based on the validation of the subset of the documents. The threshold may be preprogrammed or may be provided in the request to train the learning model. In the event the accuracy of the learning model's threshold is not met, a request may be transmitted to retrain the learning model with the same set of documents or a different set of documents.

In the event the accuracy of the learning model's classification meets the threshold, model approval flow 400 may proceed to operation 406. In operation 406, an SME may manually confirm the classifications assigned to a subset of documents of the set of documents by the learning engine. In some embodiments, the SME may validate the classifications of the same subset of documents as the learning model. Alternatively, the SME may validate the classifications of a different subset of documents. For example, the subset of documents may be 10% of the set of documents.

The SME may confirm whether the learning engine, based on the document's metadata, accurately classified each document of the subset of documents. Furthermore, the SME may also confirm whether the metadata is accurate. For example, as indicated above, the metadata may be assigned to the document by an SME or received from a third-party. Therefore, the SME may identify any scenarios where the learning model correctly classified the document, and the metadata includes an incorrect classification of the document. In response to validating the classification of the subset of documents, the SME may determine whether an Acceptable Quality Limit (AQL) has been achieved. The AQL may be a value associated with a desired accuracy level of the learning model. In some embodiments, the AQL may be the same as the threshold. In other embodiments, the AQL may be different from the threshold. In the event the SME determines that the AQL has not been met, a request may be transmitted to retrain the learning model.

In operation 408, in response to the SME determining that the AQL has been met, the SME may approve the learning model. The learning model may be considered fully trained and ready to classify documents.

Figure 5:
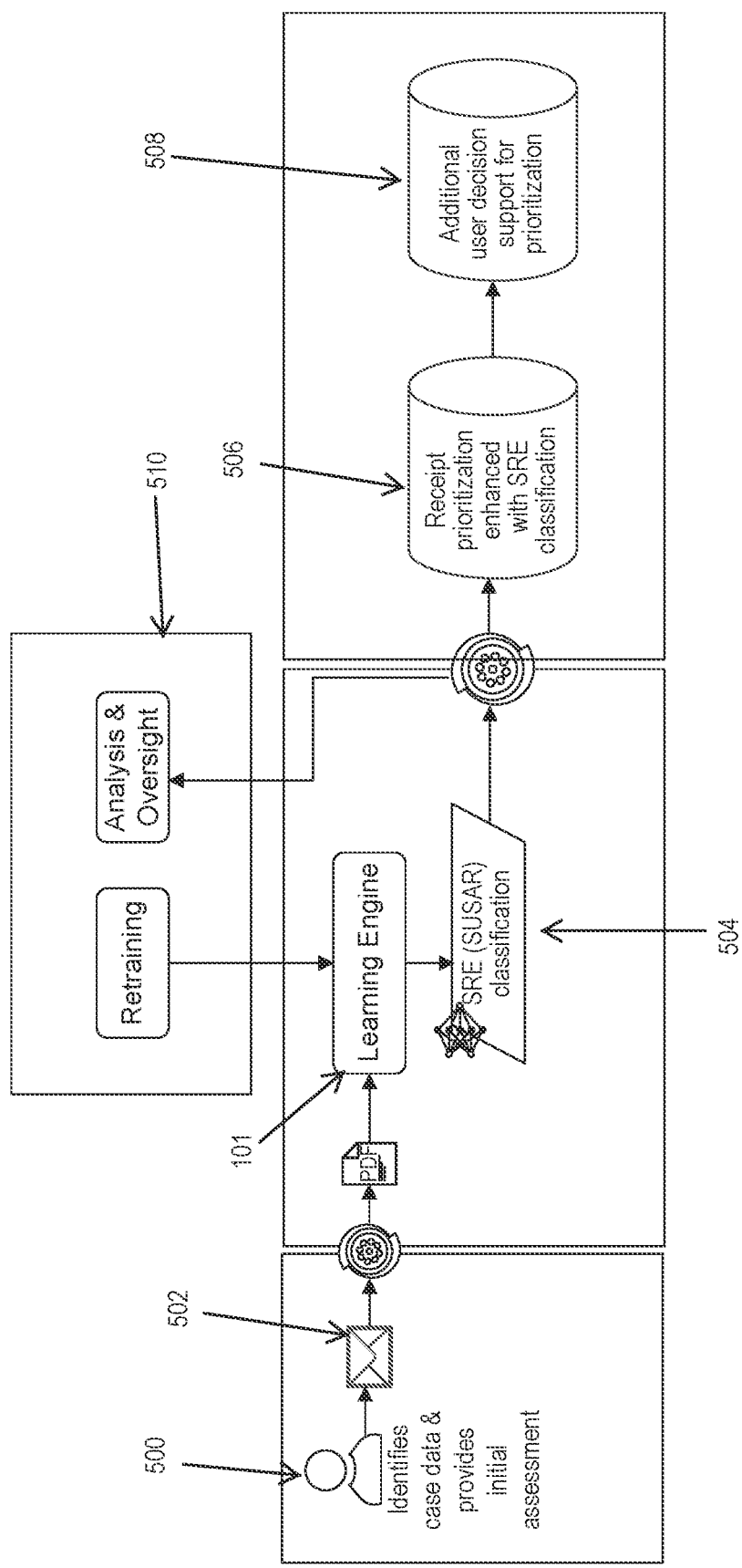
FIG. 5 is a block diagram illustrating the data flow of classifying documents using a trained learning engine, according to example embodiments.

FIG. 5 is a block diagram illustrating the data flow of classifying documents using a trained learning engine, according to example embodiments. FIG. 5 will be described with respect to FIG. 1.

In an embodiment, intake engine 115 may receive a request to classify a document. For example, a user 500 may provide an initial assessment of the document. For example, user 500 may provide an initial priority value (e.g., high, medium, or low). The request may include the initial assessment and the document to be classified. The document may be a PV document.

Intake engine 115 may transmit the request to classification application 114. Classification application 114 may store the request in an inbox 502 of a mail or messaging application.

Script 109 may periodically poll inbox 502 to determine whether there are any new requests to classify documents. In response to detecting a new request to classify a document, script 109 may forward the document to conversion engine 103. If the document is not in a predetermined format (e.g., a PDF format), script 109 may convert the document into the predetermined format. Script 109 may transmit the document to the cognitive services 503. Cognitive services may include learning engine 101 and conversion engine 103. Conversion engine 103 may convert the document into an image file, including a single image stack, as described above. Conversion engine 103 may transmit the image file and a request to classify the document to learning engine 101.

API 102 may receive the image file and the request to classify the document and forward the image file and the request to classify the document to first, second, and third learning models 104-108. First, second, and third learning models 104-108 may assign a first, second, and third classification to the document using the image file, as described above with respect to FIGS. 1-3. Learning engine 101 may generate output 504. Output 504 may include first, second, and third classification, a priority based on first, second, and third classification, and a confidence score. The confidence score indicates the likely accuracy of the first, second, and third classification. Learning engine 101 may forward output 504 to an Interactive Response Technology (IRT) service 506.

IRT service 506 may be a service configured to interact with learning engine 101. For example, TRT service 506 may be configured to collect classification information from learning engine 101, such as output 504. IRT service 506 prioritizes the document based on the assigned priority in output 504. IRT service 506 may reside on server 100 or a separate server.

IRT service 506 may forward output 504 to transactional service 508. Transactional service 508 may request user input to verify the prioritization of the document based on the first, second, and third classification. Transactional service 508 may reside on server 100 or a separate server.

Transactional service 506 may forward output 504 to an analysis workflow 510. In analysis workflow 510 may, a user (e.g., subject matter expert) may verify the accuracy of output 504 in view of the document. Specifically, the user may verify the accuracy of the first, second, and third classification and priority. In response to verifying the accuracy of output 504, learning engine 101 may be tuned or re-trained. For example, if learning engine 101 incorrectly assigned the first, second, and third classification or the priority, learning engine 101 may be tuned or retrained to improve its accuracy.

Figure 6:
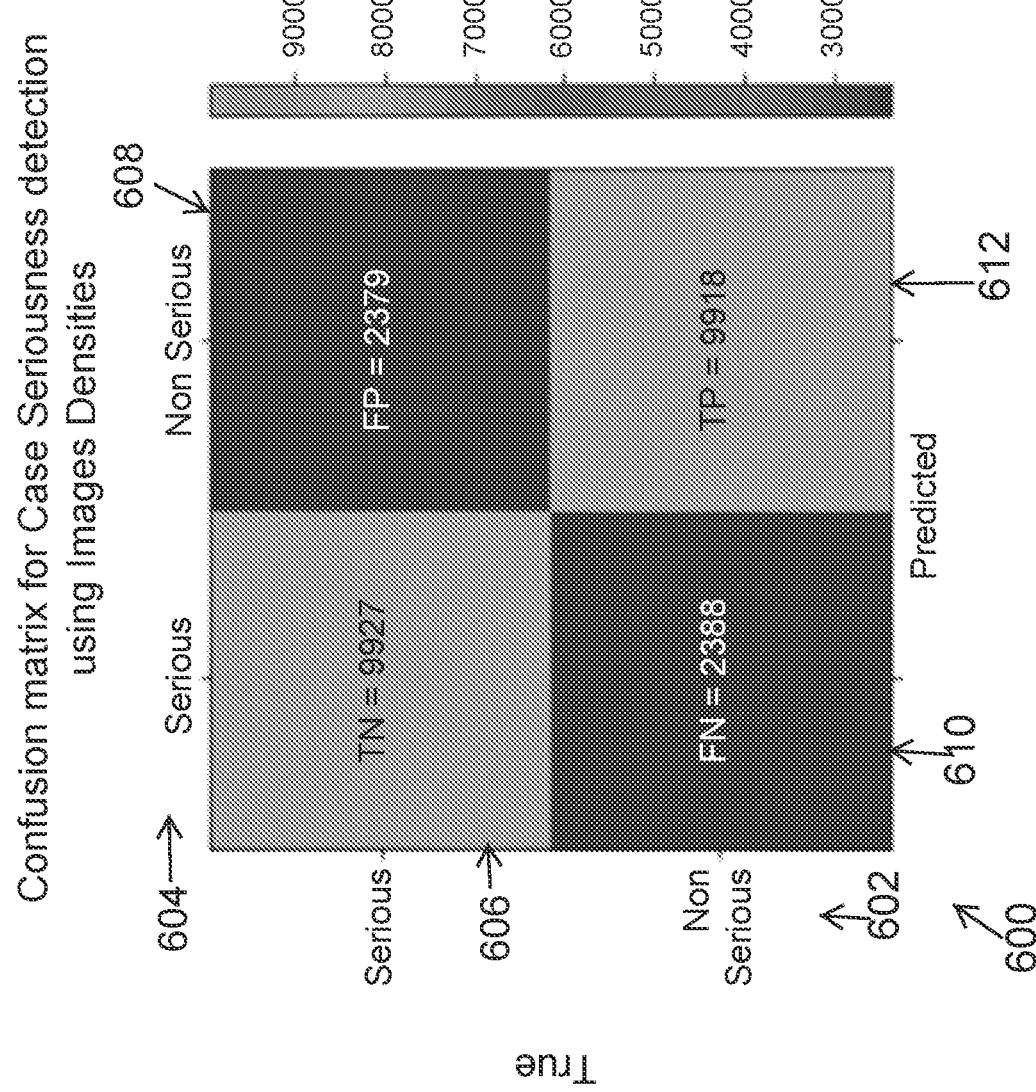
FIG. 6 is a block diagram illustrating a confusion matrix for case seriousness detection using a learning model, according to example embodiments.

FIG. 6 is a block diagram illustrating a confusion matrix for case seriousness detection using a learning model, according to example embodiments. Confusion matrix 600 may indicate the true positives, false positives, true negatives, and false negatives of the classifications assigned by the learning model. Confusion matrix 600 may be used to determine the effectiveness and accuracy of a learning model.

Confusion matrix 600 may be associated with classifications assigned to an ICSR document. In particular, the classifier may be non-serious. That is, the learning model may be trained to classify documents as non-serious. The learning model will assume those documents not classified as non-serious are classified as serious.

Confusion matrix 600 may include a first axis 602, indicating the actual classification of a document, and a second axis 604, indicating the predicted classification by the learning model. First and second axis 602-604 may include labels of the documents based on the classification. The labels may be serious or non-serious. The learning model configured to classify documents based on seriousness may be configured to identify documents that indicate a non-serious adverse effect. That is, the true value of a document including a "serious" adverse effect is negative, and the true value of a document including a "non-serious" adverse effect is positive.

Confusion matrix 600 may include quadrants 606, 608, 610, and 612. In the example of FIG. 5, quadrant 606 may indicate that the learning model accurately predicted that 9927 documents did not include a non-serious adverse effect (true negative). Quadrant 608 may indicate that the learning model inaccurately predicted that 2379 documents included a non-serious adverse effect (false positive). Quadrant 610 may indicate that the learning model inaccurately predicted that 2388 documents included a non-serious adverse effect (false negative). Quadrant 612 may indicate that the learning model accurately predicted 9918 documents included a non-serious adverse effect (true positive).

Confusion matrices may also be generated for validity and SRE. For example, Table 2 provides example experimental data from confusion matrices for seriousness, validity, and SRE.

TABLE 1

|  | Case Seriousness | Case Validity | Case SRE |
| --- | --- | --- | --- |
| True Negatives | 9927 | 49537 | 5431 |
| False Positives | 2379 | 1076 | 1508 |
| False Negatives | 2388 | 1199 | 1532 |
| True Positives | 9918 | 7100 | 5407 |

As indicated in Table 2, when training the learning model for assigning a classification associated with validity for a document, the learning model may generate 48,537 true negatives, 1076 false positives, 1199 false negatives, and 7100 true positives. Furthermore, when assigning a classification associated with the SRE of an adverse effect, the learning model may generate 5431 true negatives, 1508 false positives, 1532 false negatives, and 5407 true positives.

Figure 7:
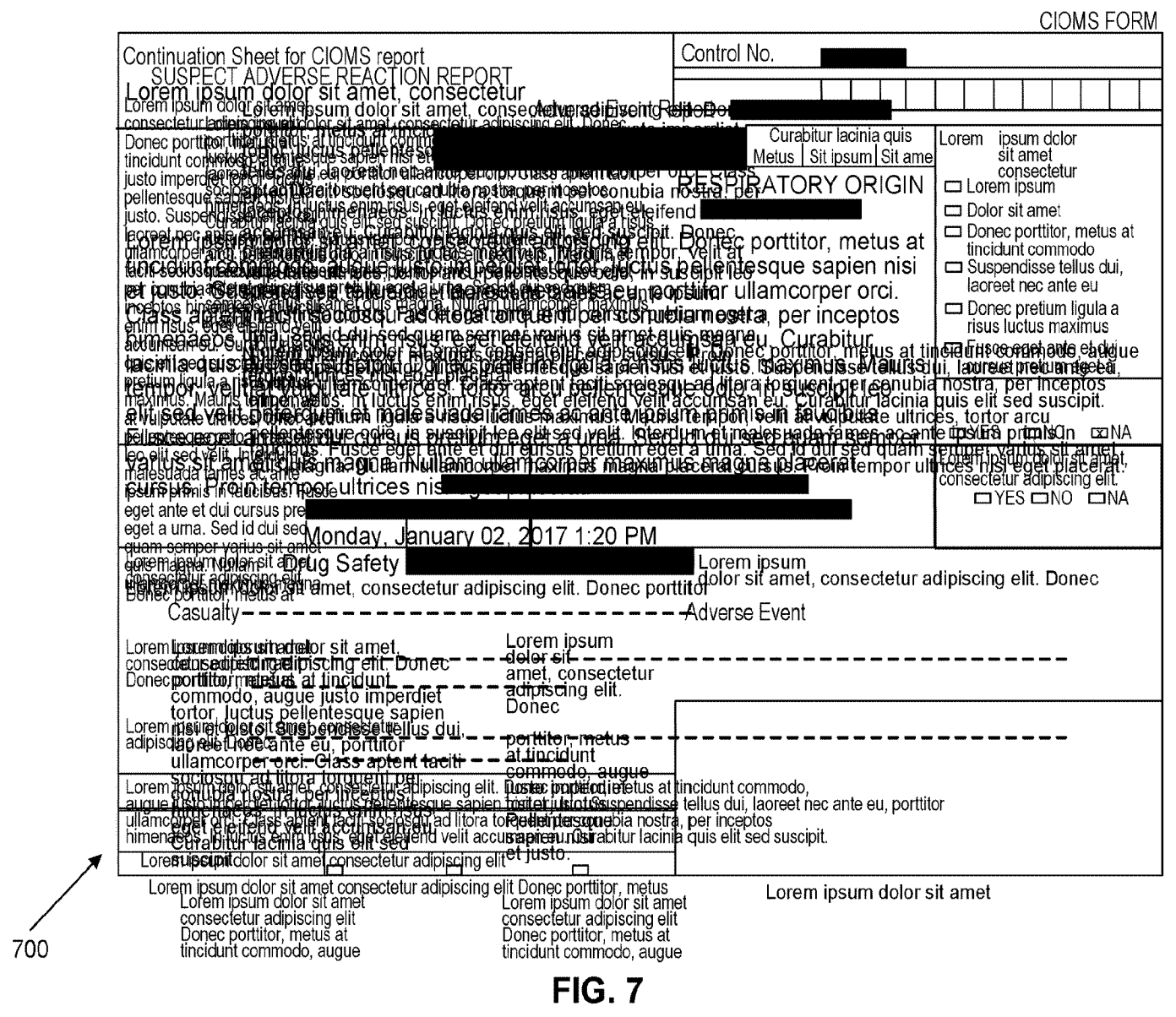

FIG. 7 is an example single image stack, according to example embodiments. As indicated above, a conversion engine (e.g., conversion engine 103, as shown in FIGS. 1-2) may convert a document into an image file (e.g., a JPEG image file). The image file may include multiple pages. Conversion engine 103 may blend pages of the image file to generate single image stack 700. Therefore, single stack image 700 may be a composite of all the pages of an image file.

For example, the conversion engine may use an image manipulation application, such as ImageMagick, developed by ImageMagick Studio LLC (https://imagemagick.org/). The conversion engine may provide one or more of the following to the image manipulation application to generate a single image stack: a desired image resolution in dots per inch (e.g., 3000), target image colorspace (e.g., gray), desired width and height of the image file and desired background of the single stack image (e.g., white, light gray, transparent, slate gray 1, and dark gray).

Furthermore, the conversion engine may provide an instruction to the image manipulation application to overlay each page of the image file on top of each other by multiplying the content of each page of the image file by the destination (e.g., the first page of the image file) and replacing the destination with the resulting product. For example, in the event an image file includes three pages, the second page's content is multiplied by the first page, and the resulting product of the content of the first and second pages may replace the first page. The product of the content of the first and second pages may be the new first page of the image file. Subsequently, the content of the new first page is multiplied by the content of the third page, and the result of the product of the content of the third page and the content of the new first page may replace the new first page. The product of the content of the third page and the content of the new first page may be a single page that includes the content of the first, second, and third pages. The multiplication operation may allow the image manipulation application to overlay the content of the multiple pages on a single page. The following operations may also or alternatively be used to overlay the content of multiple pages on a single page: exclusion, plus, add and subtract.

The conversion engine may also provide an instruction to merge the pages of the image file using the darkest pixel in the stack for each page of the image file. The instruction to use the darkest pixel in the stack for each page of the image file may be "min." The instruction to use the lightest pixel in the stack for each page of the image file may be "max." The instruction to generate an average of the pages of the image file may be "mean." The instruction "min" may generate a clear and readable result.

In an embodiment, the conversion engine may instruct the image manipulation application to create a new image file by merging the pages of the image file. That is, the conversion engine may instruct the image manipulation application to generate a composite of the pages of the image file and store the composite as a new image file. For example, single image stack 700 may be stored as a new image file.

Figure 8:
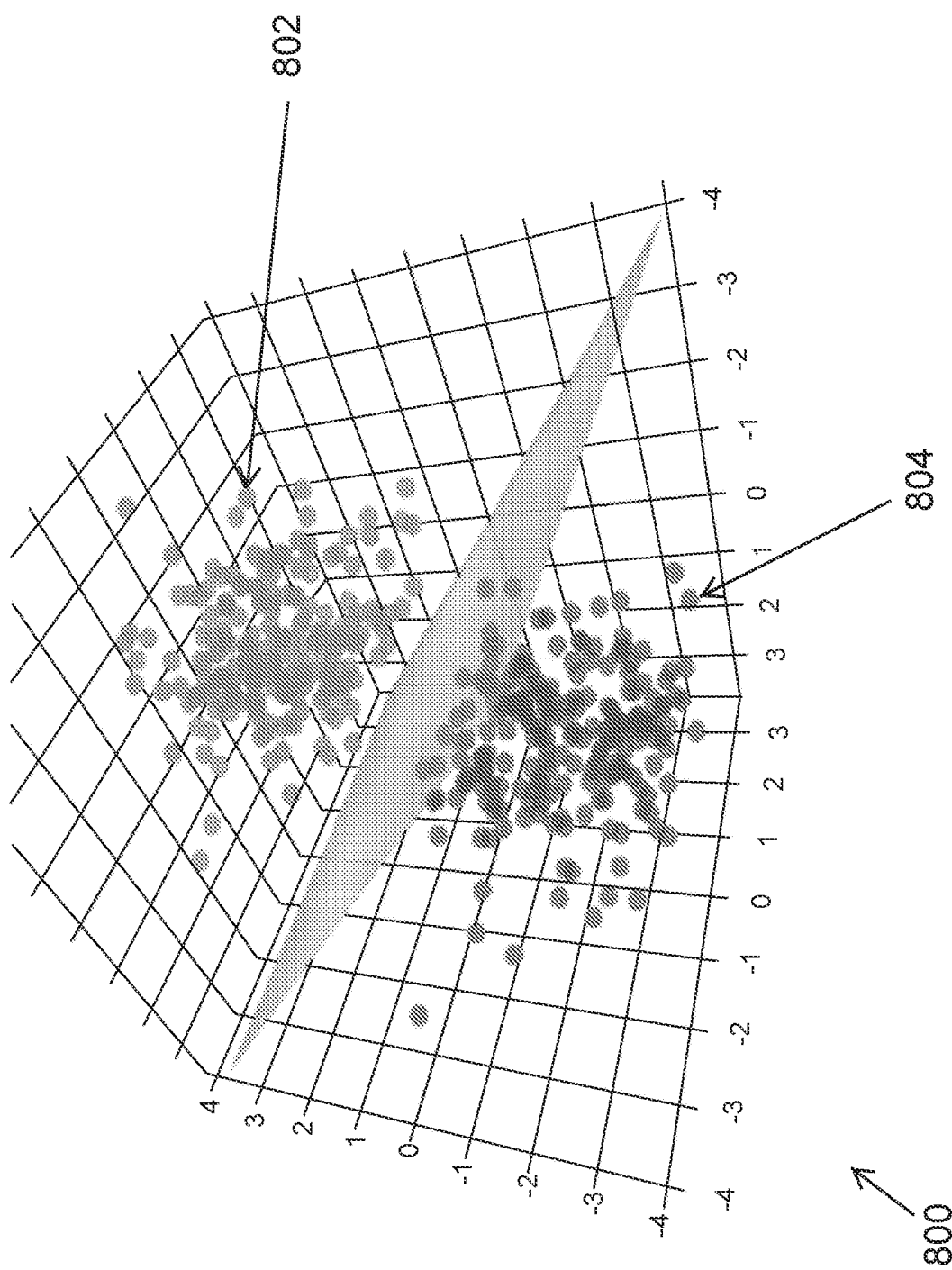
FIG. 8 is a vector space distribution, according to example embodiments.

FIG. 8 is a vector space distribution, according to example embodiments. Vector space distribution 800 may include positive and negative classes processed by the fully connected layers of the CNN algorithm. The CNN algorithm may classify a document negatively or positively. For example, in the event, the CNN algorithm classifies a document as a valid document, the CNN algorithm has classified this document positively. Alternatively, in the event, the CNN algorithm has classified a document as non-valid, the CNN algorithm has classified the document negatively. Vector space distribution 800 illustrates the accuracy at which the CNN algorithm has delineated between positive classes 802 and negative classes 804. Each dot may indicate a document in positive and negative classes 802-804.

Figure 9:
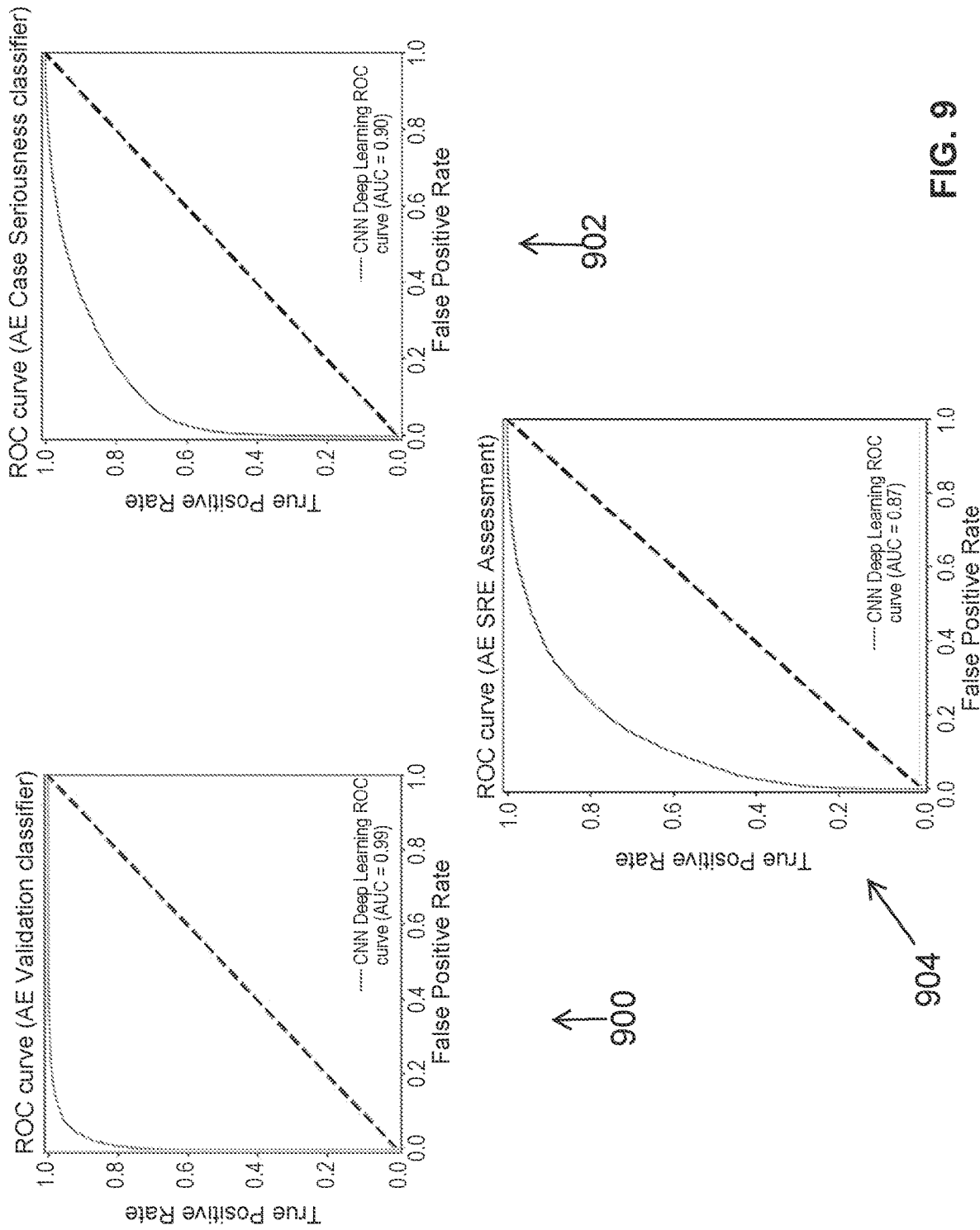
FIG. 9 illustrates receiver operating characteristic (ROC) graphs generated based on the classifications assigned to a document by the first, second, and third learning models, according to example embodiments.

FIG. 9 contains example receiver operating characteristic (ROC) graphs generated based on the classifications assigned to a document by the first, second, and third learning models, according to some embodiments. For example, ROC graphs 900, 902, and 904 may be used to determine whether the first, second, or third learning models are appropriately trained to classify documents.

As indicated above, the first, second, and third learning models may generate a first, second, and third classification of a document. As an example, the document may be an ICSR document. Furthermore, the first classification may indicate the validity of the ICSR document, the second classification may indicate the seriousness of the ICSR document, and the third classification may be associated with the SRE of an adverse effect included in the ICSR document.

In the example of FIG. 8, ROC graph 900 corresponds to the first classification (e.g., validity), ROC graph 902 corresponds to the second classification (e.g., seriousness), and ROC graph 904 corresponds to the third classification (e.g., an SRE of an adverse effect). Therefore, ROC graphs 900-904 may be used to determine the effectiveness or accuracy of each learning model.

ROC graphs 900-904 include an x-axis representing the false positive rate and a y-axis representing the true positive rate. Furthermore, ROC graphs 900-904 include a ROC curve for each respective classification. ROC curves plot the true positive rate vs. false positive rate based on the classification threshold. ROC graphs 900-904 also indicate the area under the curve (AUC) value based on the ROC curve. The AUC value is a measure of the ability of the respective learning model to distinguish between classes. The AUC value may be a value between 0 and 1. The higher the AUC value, the higher the ability of the respective learning model to distinguish between classes. When the AUC value is one, the respective learning model may perfectly classify the documents. However, if the AUC is 0, then the respective learning model is incorrectly classifying all the documents.

In the example of FIG. 9, which represents values obtained by the inventors in testing the models over a sample set of approximately 500,000 ICSRs, ROC graph 900 indicates a 0.99 AUC value for the first learning model, ROC graph 902 indicates a 0.90 AUC value for the second learning model, and ROC graph 904 indicates a 0.87 AUC value for the third learning model.

Figure 10:
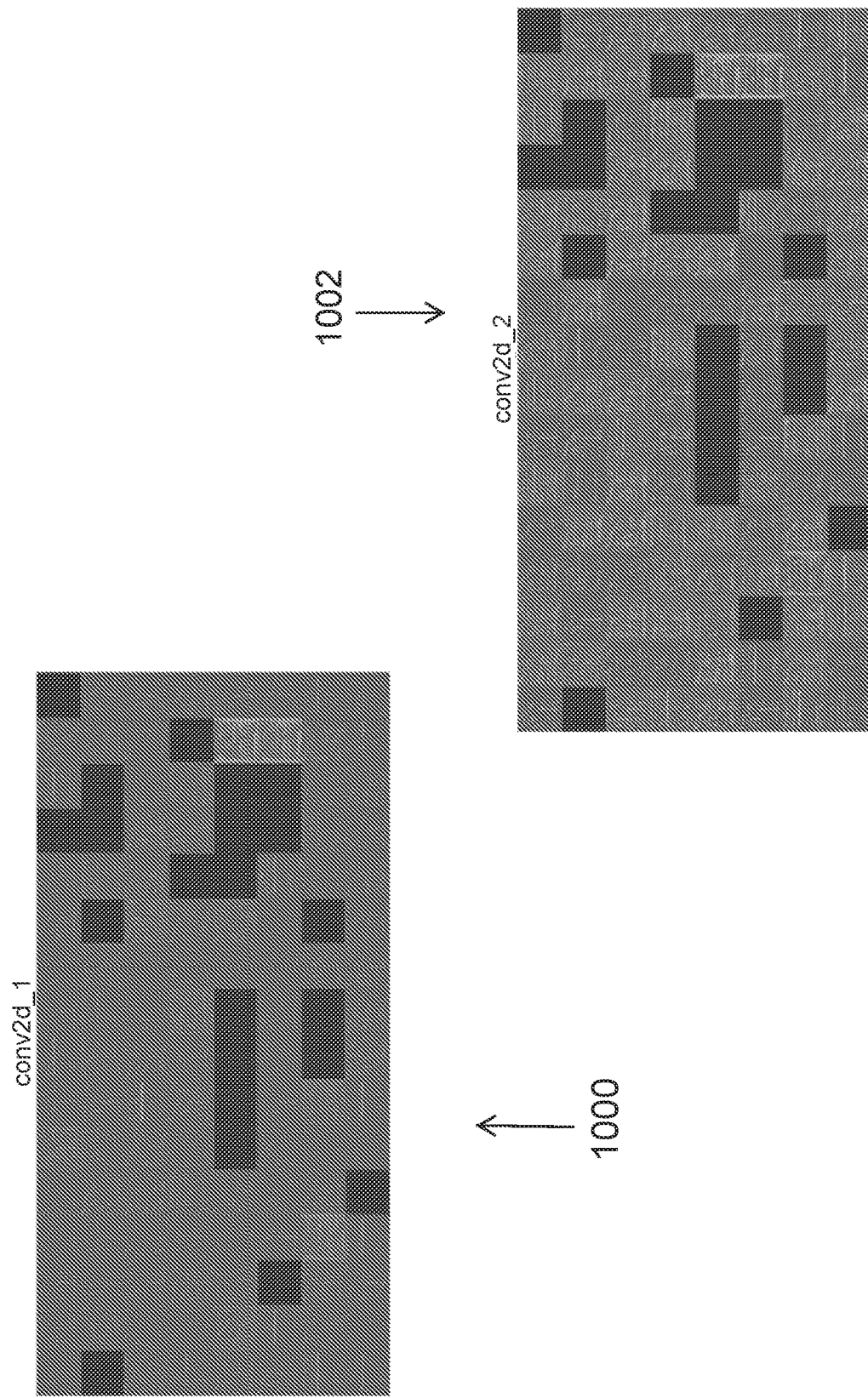
FIG. 10 illustrates feature maps generated using convolution layers of the CNN algorithm, according to example embodiments.

FIG. 10 illustrates feature maps generated using convolution layers of the CNN algorithm, according to example embodiments. As indicated above, convolution layers of the CNN algorithm may extract features from an image by applying a filter to the image. Multiple different filters may be applied to the image to generate different feature maps. The filter may be attempting to extract a given feature. For example, a filter may be configured to extract all the edges from the image. Alternatively, a filter may be configured to extract a given shape from the image. Furthermore, multiple different convolution layers may be included in a CNN algorithm. Therefore, a feature map may be generated for each convolution layer. The first feature map generated in the first convolution layer of the CNN algorithm may retain most of the information of the image. For each feature map generated by a subsequent convolution layer, the feature map may look less like the image and instead more like an abstract representation of the image because, for each convolution layer, there may be fewer features to detect.

As illustrated in the embodiment of FIG. 10, feature maps 1000 and 1002 include bright areas and darker areas. The bright areas indicate an activated region. The activated region may indicate that the filter detects a pattern that it was configured to detect (e.g., an edge or a shape). The darker areas represent areas of the image where the filter did not detect any features.

FIGS. 11A-13B illustrate experimental values obtained by the inventors when training a learning model using over a sample set of approximately 500,000 ICSRs. The CNN algorithm used in the experiment used a LeNet-5 architecture. The CNN LeNet-5 architecture may be used to identify patterns in handwritten or typed characters. The CNN LeNet-5 architecture can be optimized with an increased data source image size, changed model optimizer, increased dropout rate, and activation functions to process a high variety of incoming image data. This experiment was conducted using a Linux instance on AWS with 32 cores CPU, 240 GB RAM, 4 Tesla V100 GPUs/32 GB memory each for model training using Keras/Tensorflow API.

Figure 11A:
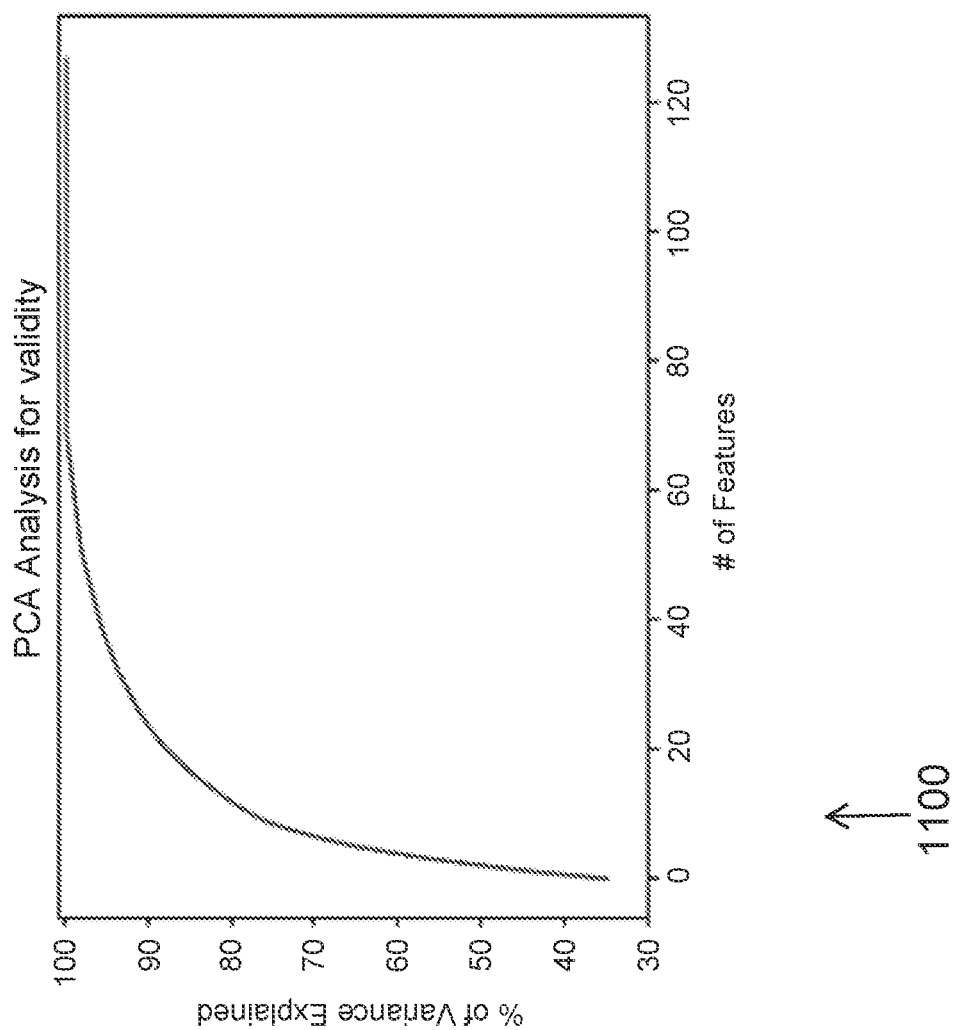
FIG. 11A is a graph indicating a principal component analysis (PCA) for a validity classification, according to example embodiments.

FIG. 11A illustrates a graph 1100 indicating a principal component analysis (PCA) for a validity classification, according to example embodiments. PCA may be used to reduce the dimensionality of the features extracted from an image using the CNN algorithm. In particular, PCA may be used to identify the features that account for a threshold amount of the variance. Therefore, PCA may identify features that do not need to be extracted from the image.

For example, graph 1100 may indicate a PCA for a validity classification. In the example of FIG. 11A, which represents experimental values obtained by the inventors over a sample set of approximately 500,000 ICSRs, graph 1100 indicates that 40 features out of over 120 features account for 90% of the variance for the validity classification. As such, the identified 40 features may be extracted from a given image to assign a validity classification to document corresponding to the given image.

Figure 11B:
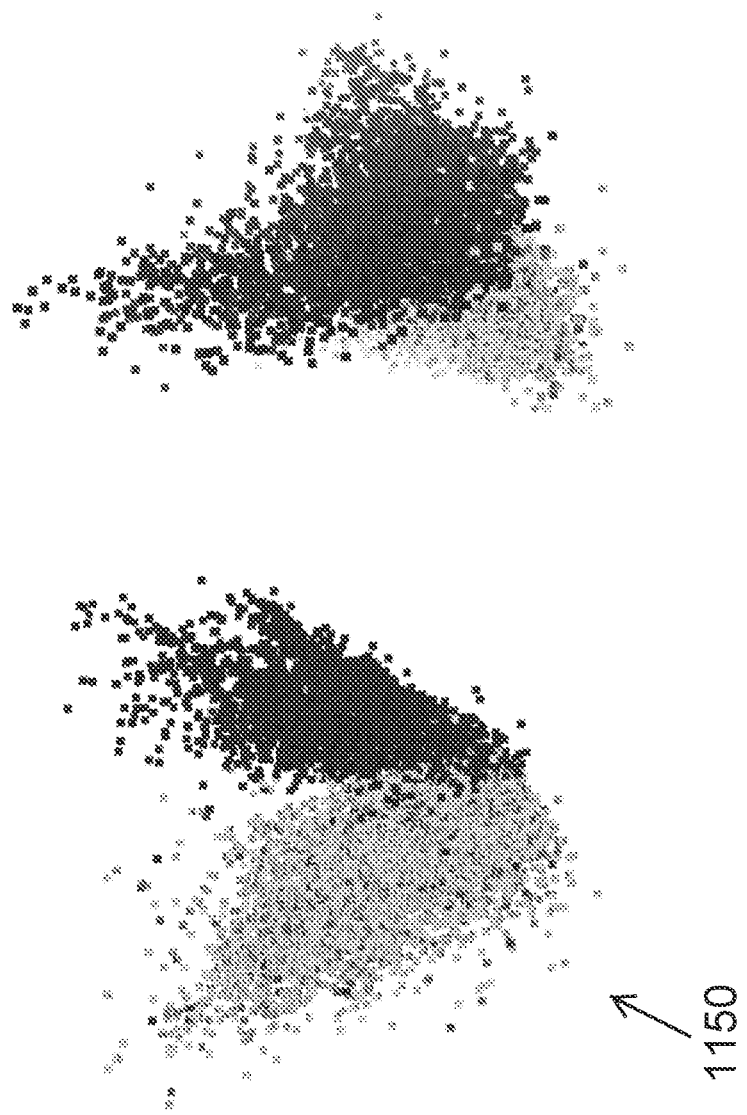
FIG. 11B illustrates a distribution of valid documents as compared to non-valid documents, according to example embodiments.
Figure 12A:
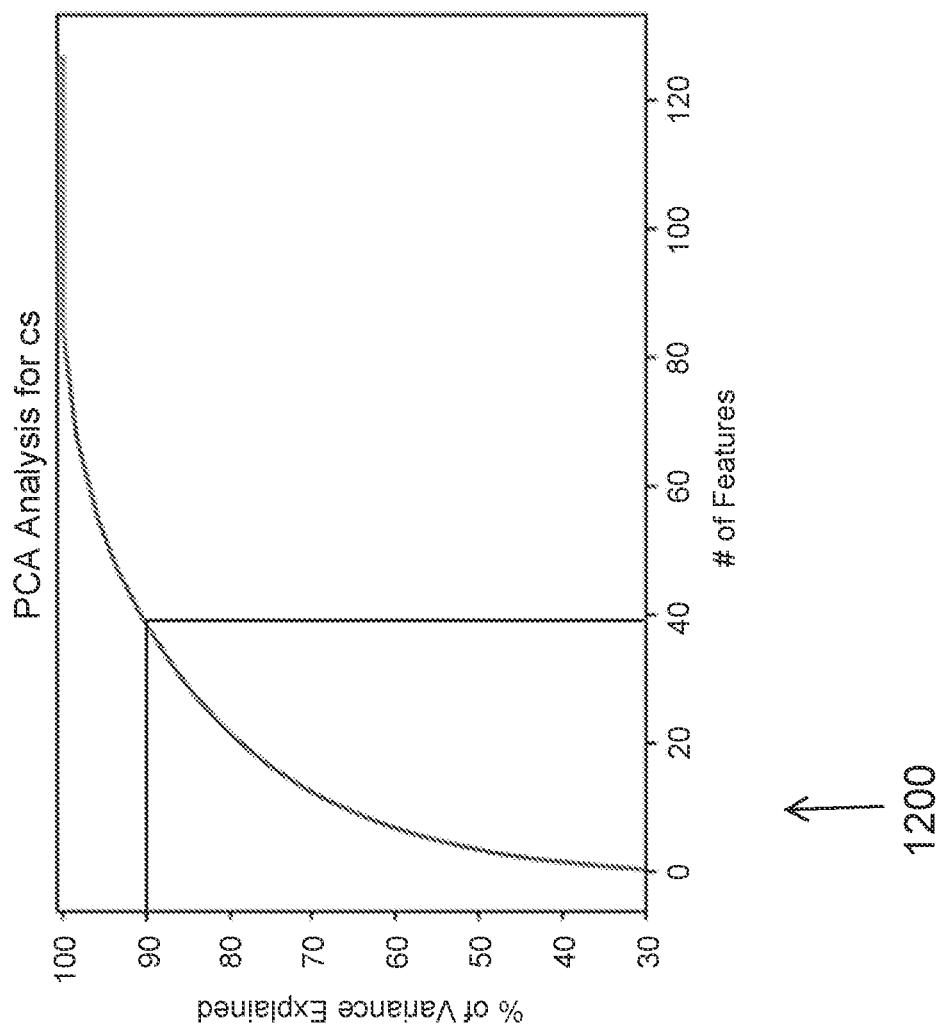
FIG. 12A is a graph indicating a PCA for a seriousness classification, according to example embodiments.

FIG. 11B illustrates tensor board outputs showing experimental results for a distribution of valid documents as compared to non-valid documents using the sample set of approximately FIG. 11A. The tensor board outputs may be shown as graph 1050. Graph 1050 illustrates the clustering of the classification of the documents across a three-dimensional space. Graph 1150 includes multiple views of the clustering of the classification of the documents across the three-dimensional space. Each dot or element represents a document that has been classified using the learning model. Graph 1150 shows a clear delineation between documents that are classified as valid as compared to non-valid. This indicates an accuracy at which the learning classifies each document FIG. 12A illustrates a graph 1200 indicating a PCA for a seriousness classification, according to some embodiments. In the example of FIG. 12A, which represents experimental values obtained by the inventors over a sample set of approximately 500,000 ICSRs, graph 1200 indicates that 25 features out of over 120 features account for 90% of the variance for the seriousness classification. As such, the identified 25 features may be extracted from a given image to assign the seriousness classification to document corresponding to the given image.

Figure 12B:
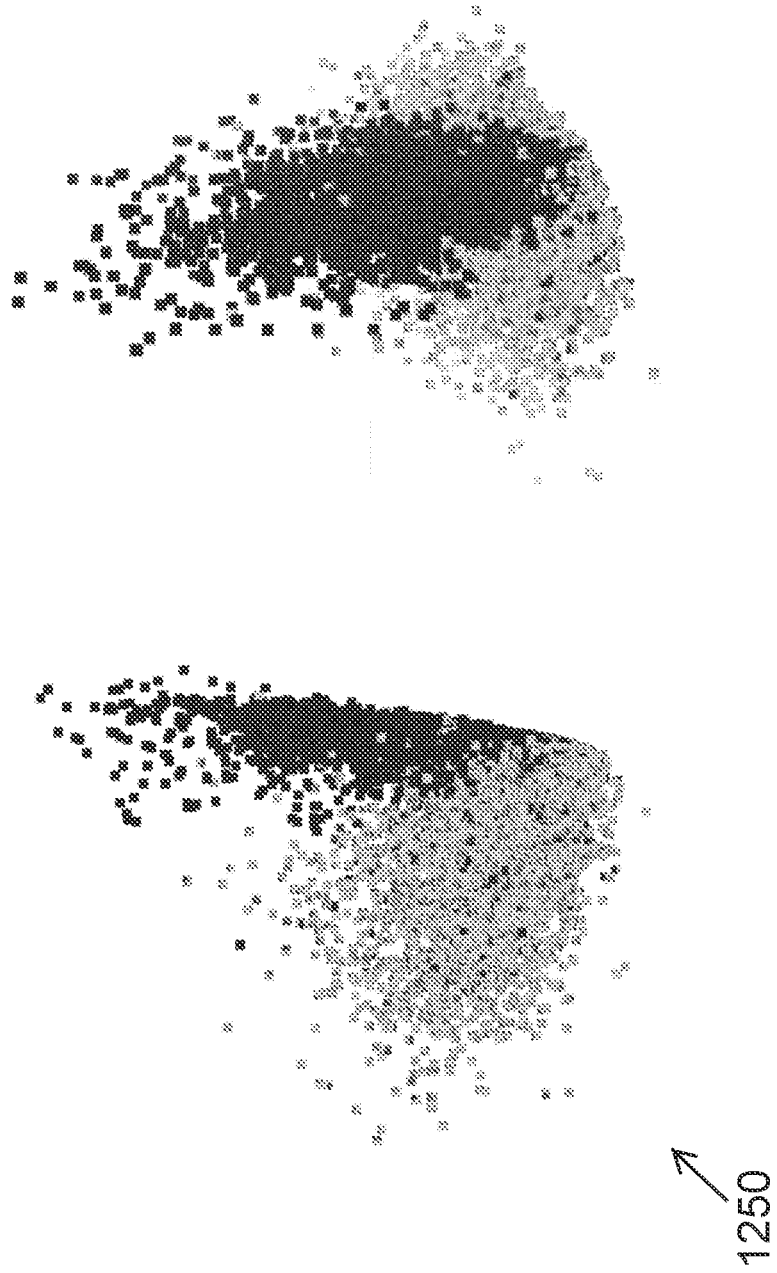
FIG. 12B illustrates a distribution of serious documents as compared to non-serious documents, according to example embodiments.
Figure 13A:
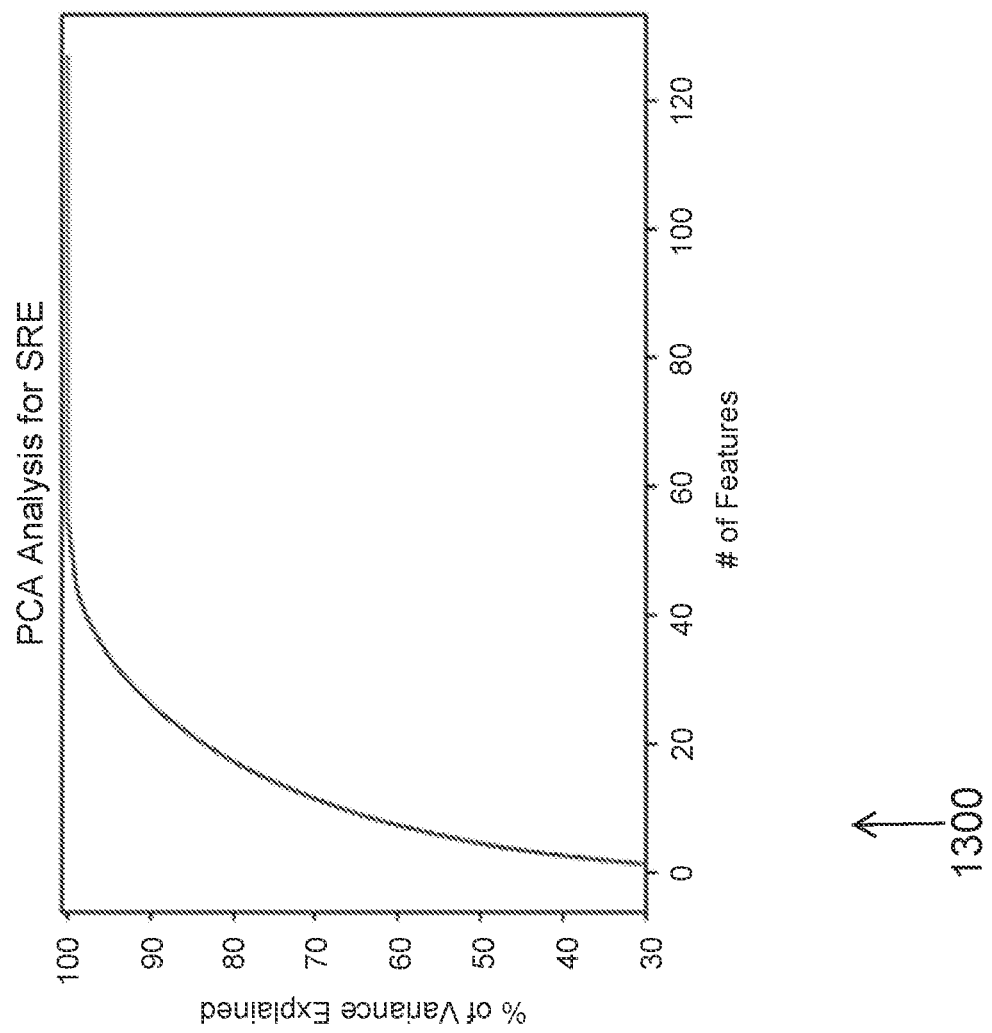
FIG. 13A is a graph indicating a PCA for seriousness, relatedness, and expectedness (SRE) classification, according to example embodiments.

FIG. 12B illustrates tensor board outputs showing experimental results for a distribution of serious documents as compared to non-serious documents, using the sample set of FIG. 12A. The tensor board outputs may be shown in graph 1250. Graph 1250 illustrates the clustering of the classification of the documents across a three-dimensional space. Graph 1250 includes multiple views of the clustering of the classification of the documents across the three-dimensional space. Each dot or element represents a document that has been classified using the learning model. Graph 1250 shows a clear delineation between documents that are classified as serious as compared to non-serious. This indicates an accuracy at which the learning classifies each document FIG. 13A illustrates a graph 1300 indicating a PCA for an SRE classification, according to some embodiments. In the example of FIG. 12A, which represents experimental values obtained by the inventors over approximately 500,000 ICSRs, graph 1300 indicates that 25 features out of over 120 features account for 90% of the variance for the SRE classification. As such, the identified 25 features may be extracted from a given image to assign a classification associated with an SRE to documents corresponding to the given image. This indicates an accuracy at which the learning classifies each document.

Figure 13B:
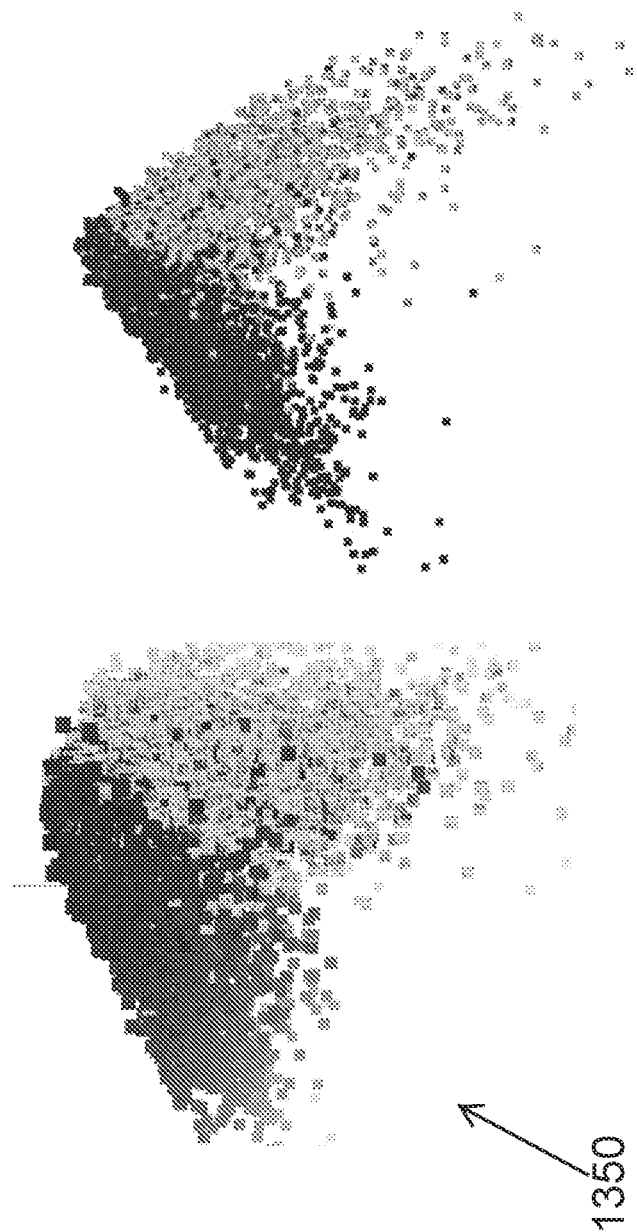
FIG. 13B illustrates a distribution of expected effect documents as compared to unexpected effect documents, according to example embodiments.

FIG. 13B illustrates tensor board outputs showing experimental results for a distribution of expected effect documents as compared to unexpected effect documents (e.g., SRE), using the sample set of FIG. 13A. The tensor board outputs may be shown in graph 1250. Graph 1350 illustrates the clustering of the classification of the documents across a three-dimensional space. Graph 1350 includes multiple views of the clustering of the classification of the documents across the three-dimensional space. Each dot or element represents a document that has been classified using the learning model. Graph 1350 shows a clear delineation between documents classified to have an expected effect compared to documents classified with an unexpected effect (SRE classification). This indicates an accuracy at which the learning classifies each document.

Figure 14:
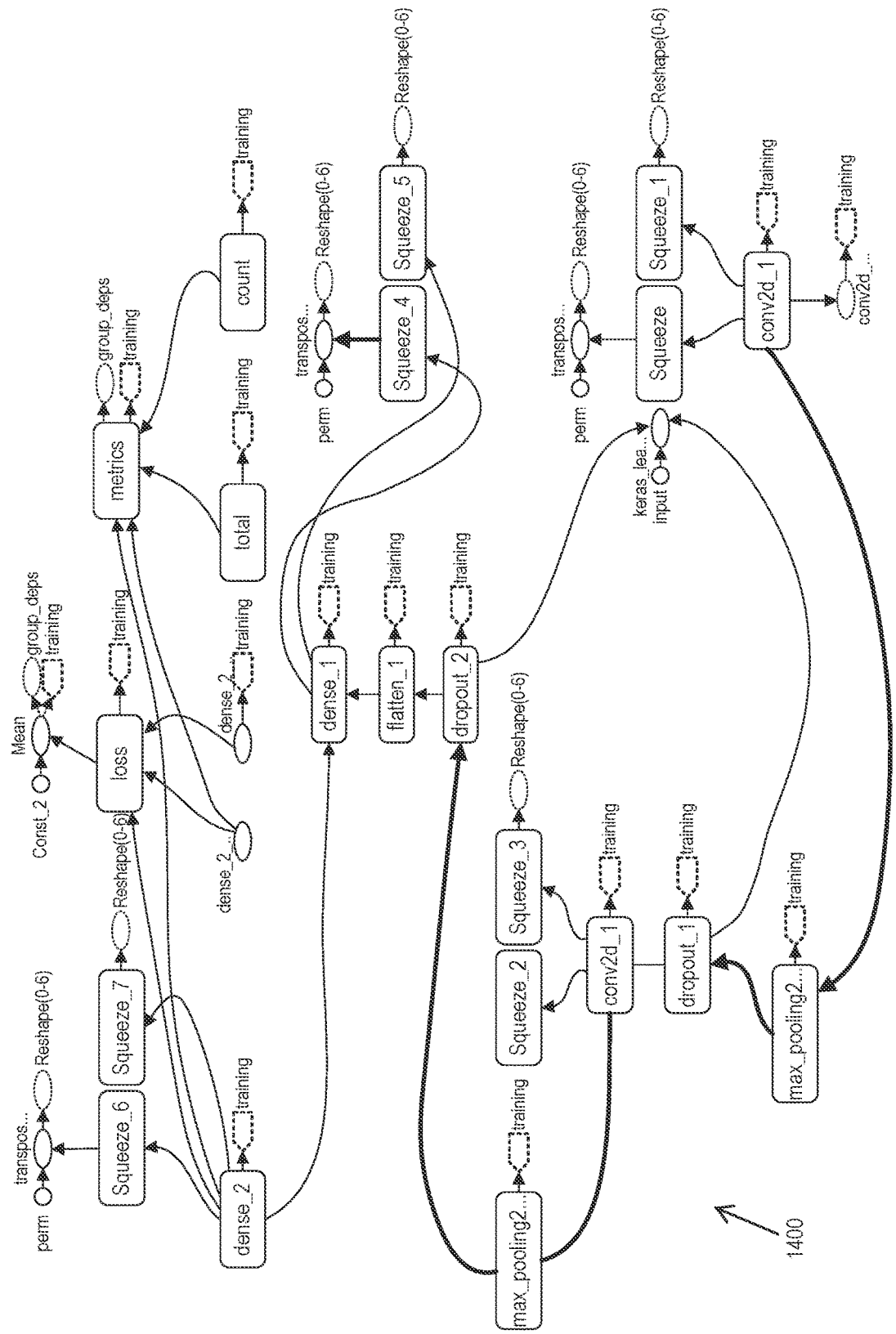
FIG. 14 is a tensor board graph showing the visualization of training a learning model, according to example embodiments.

FIG. 14 is a tensor board graph showing the visualization of training a learning model, according to example embodiments. As indicated above, a learning model (e.g., first, second, and third learning models 104-108) may implement CNN algorithms. Graph 1400 may include the different functions executed while training a CNN algorithm. The functions may be part of the convolution, max-pooling, and fully connected layers of the CNN algorithm. For example, the functions may include functions related to feature extraction and generating feature maps (e.g., conv2d n), max-pooling (e.g., maxpooling n), reducing dimensionality (e.g., Squeeze n), preventing overfitting (e.g., dropout n), applying linear activation (e.g., dense n), flattening a multi-vector array (e.g., flatten n), identifying how far the predicted value deviate from the actual values (e.g., loss n), capturing metrics of training the learning model (e.g., metrics), and calculating of the metrics (e.g., count and total).

The functions conv2d n, Squeeze n, and max_pooling n may be part of the convolution and max-pooling layers of the CNN algorithm. The function flatten_n and dense_n may be part of the fully connected layers of the CNN algorithm.

Figure 15:
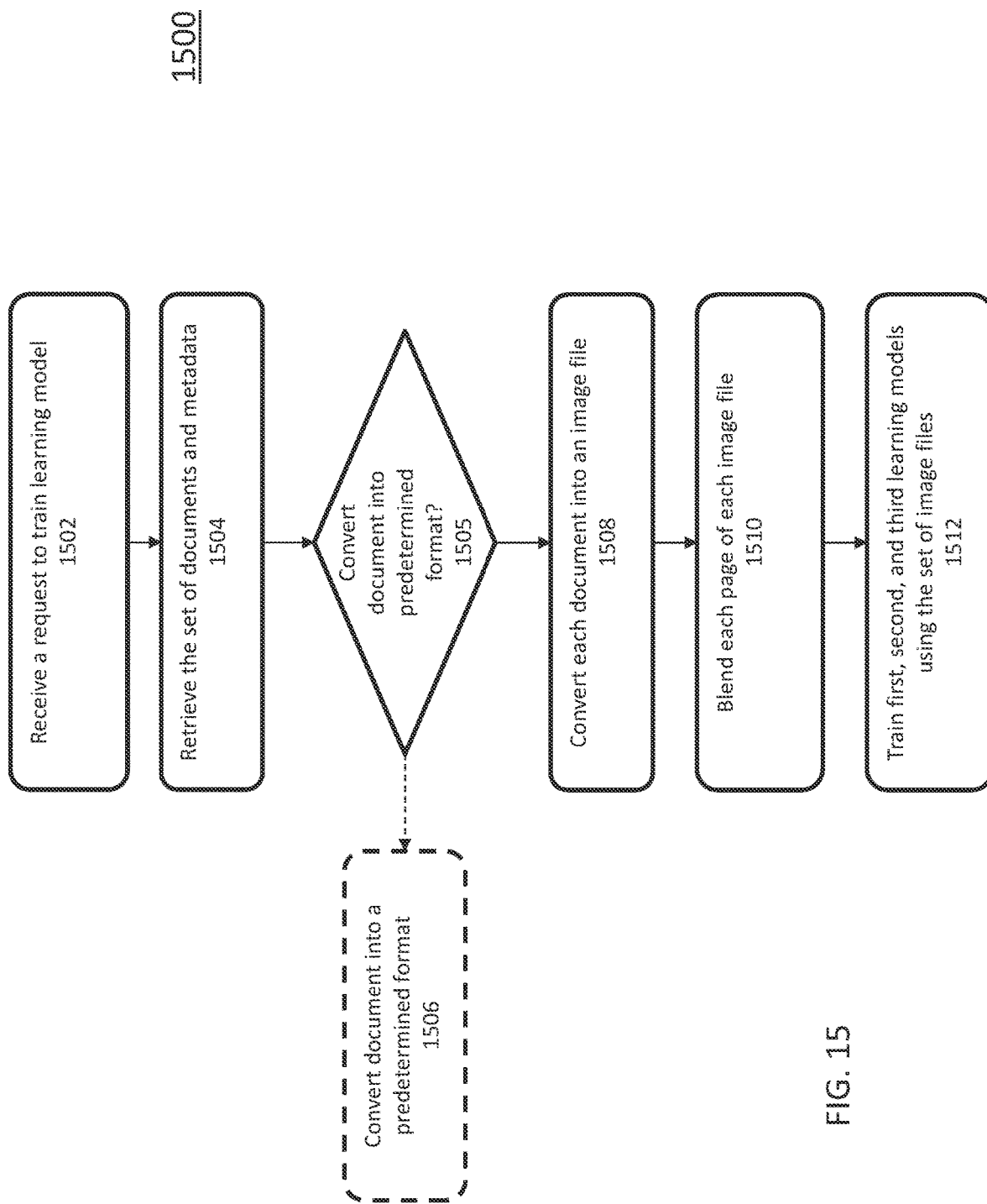
FIG. 15 is a flowchart illustrating a process for preparing image files to train a learning model, according to example embodiments.

FIG. 15 is a flowchart illustrating the process for preparing image files to train a learning model according to an embodiment. Method 1500 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 15, as will be understood by a person of ordinary skill in the art.

Method 1500 shall be described with reference to FIG. 1. However, method 1500 is not limited to that example embodiment.

In operation 1502, server 100 receives a request to train at least one of first, second, or third learning models 104, 106, and 108 to classify a document. The request may be transmitted by client device 110. The request may include a query to retrieve a set of documents for training at least one of first, second, or third learning models 104-108 and metadata corresponding to each of the documents.

In operation 1504, conversion engine 103 retrieves the set of documents and metadata for each document in the set of documents using the query included in the request from database 120. The documents may include alphanumeric text. The set of documents may include documents of various formats. Furthermore, the documents in the set of documents may include a single page or multiple pages.

In operation 1505, conversion engine 103 determines whether a document needs to be converted to a predetermined format. If a document was received from the reporter in image format, then method 1400 can proceed directly to operation 1408. For example, if a reporter sends an ICSR as a JPEG file, no further conversion is needed, and the method can proceed to operation 1408. However, if a document is not already in image format, then, in embodiments, it will need to be converted from its received format into image format. In some embodiments, the document is converted directly from its received format into an image format, such as a JPEG format. In some other embodiments, the document is first converted to a common format, such as a PDF format, prior to being converted into an image format. First converting to a common format prior to image conversion allows the image conversion algorithm to operate on a single document type (e.g., PDF), thus simplifying the image conversion process.

Accordingly, in optional operation 1506, conversion engine 103 converts each document of the set of documents that is of a format that is different from a predetermined format to the predetermined format. The predetermined format may be, for example, a PDF format. Therefore, conversion engine 103 may convert each document in PDF format to a PDF format. A skilled artisan will understand that if the document is to be converted directly into an image file than indirectly, then operation 1506 may be skipped.

In operation 1508, conversion engine 103 converts each document of the set of documents into an image file, resulting in a set of image files. Each image file may be, for example, a JPEG image.

In operation 1510, conversion engine 103 blends each page of each image file, including multiple pages, into a single image stack. The single image stack may include image representations of each page of an image file in a single JPEG image. In the event the image file is a single page, the single image stack may include image representations of the single page of the image file. Therefore, each image file of the set of image files may include a single image stack.

In operation 1512, learning engine 101 may train one or more of first, second, and third learning models 104, 106, and 108 using the set of image files. One or more of first, second, and third learning models 104-108 may be trained to assign a first, second, and third classification, respectively.

Figure 16:
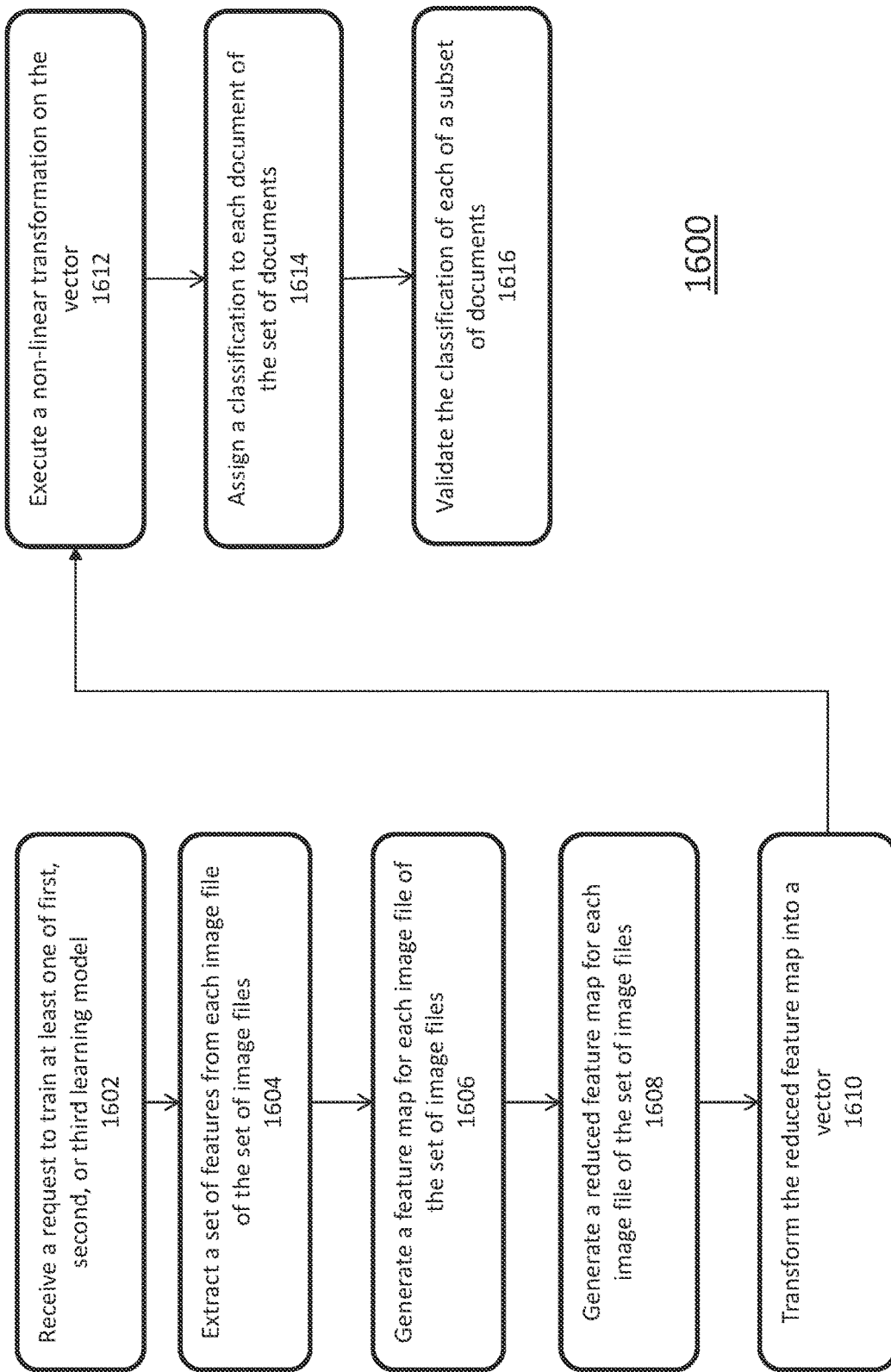
FIG. 16 is a flowchart illustrating a process for training a learning model, according to example embodiments.

FIG. 16 is a flowchart illustrating the process for training a learning model according to an embodiment. Method 1600 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 16, as will be understood by a person of ordinary skill in the art.

Method 1600 shall be described with reference to FIG. 1. However, method 1600 is not limited to that example embodiment.

In operation 1602, server 100 receives a request to train one or more models to classify documents using a set of documents. For example, server 100 receives a request to train at least one of first, second, or third learning models 104-108 to classify documents using a set of documents. The set of documents may be converted into a set of image files. Each image file may be an image representation of the document. Furthermore, each image file may include a single image stack. The single image stack may be a composite of each page of the image file. Learning engine 101 may instruct at least one of first, second, or third learning models 104-108 to execute a CNN algorithm using the set of image files.

In operation 1604, learning engine 101 extracts a set of features from each image file of the set of image files. For example, at least one of first, second, or third learning models 104-108 extracts a set of features from each image file of the set of image files. The at least one of first, second, or third learning models 104-108 may use the CNN algorithm to extract the features. A filter may be applied to each image file of the set of image files to extract the features. The features may be edges, shapes, objects, or other features in a given image file. The features may be extracted in the convolution layer of the CNN algorithm.

In operation 1606, learning engine 101 generates a feature map for each image file of the set of image files. For example, the at least one of first, second, or third learning models 104-108 generates a feature map for each image file of the set of image files. The feature map for each image file may include the set of features extracted from the image file. For example, the feature map may include activation areas. The activation areas may indicate a detected feature (e.g., edge, shape, object, or the like). The feature map may also include darker areas. The darker areas may indicate an absence of features.

In operation 1608, learning engine 101 generates a reduced feature map for each image file in the set of image files. For example, the at least one of first, second, or third learning models 104-108 generates a reduced feature map for each image file of the set of image files by reducing a dimensionality characteristic of the feature map for each image file of the set of image files. The reduced feature map may be generated by applying max or average pooling to the feature map.

In operation 1610, learning engine 101 transforms the reduced feature map for each image file into a vector. For example, the at least one of first, second, or third learning models 104-108 transforms the reduced feature map for each image file of the set of image files into a vector. The reduced feature map for each image file may be transformed into a vector in the fully connected layer. The at least one of first, second, or third learning models 104-108 may perform a linear transformation to the vector by applying weights and biases to the vector.

In operation 1612, learning engine 101 executes a non-linear transformation on the vector for each image file to identify an attribute associated with each image file. For example, the at least one of first, second, or third learning models 104-108 executes a non-linear transformation on the vector for each image file of the set of image files to identify an attribute associated with each image file of the set of image files. The non-linear transformation may be executed in the fully connected layer of the CNN algorithm.

In operation 1614, learning engine 101 assigns a classification to each document based on the identified attribute. For example, the at least one of first, second, or third learning models 104-108 assigns a classification to each document of the set of documents based on the identified attribute for each image file of the set of image files. The first, second, and third learning models may assign a first, second, third classification, respectively.

In operation 1616, learning engine validates the classification of each of a subset of documents by comparing metadata for each document to the model's classification. For example, the at least one of first, second, or third learning models 104-108 validates the classification of each of a subset of documents of the set of documents by comparing metadata for each document to the classification of each document of the set of documents. The metadata may include a classification assigned by a third party or an SME. Validation results may also be generated. For example, the at least one of first, second, or third learning models 104-108 may generate validation results. The validation results may indicate whether the at least one of first, second, or third learning models 104-108 correctly classified the subset of documents based on the metadata. The at least one of first, second, or third learning models 104-108 may use backpropagation to validate the subset of documents.

Based on the validation results, gradient descent may be used to optimize the filters, weights, and biases and re-execute operations 1602 through 1616 a predetermined number of times. For example, the at least one of first, second, or third learning models 104-108 may optimize the filters, weights, and biases after each iteration of operations 1602 through 1616 using a gradient descent operation.

Figure 17:
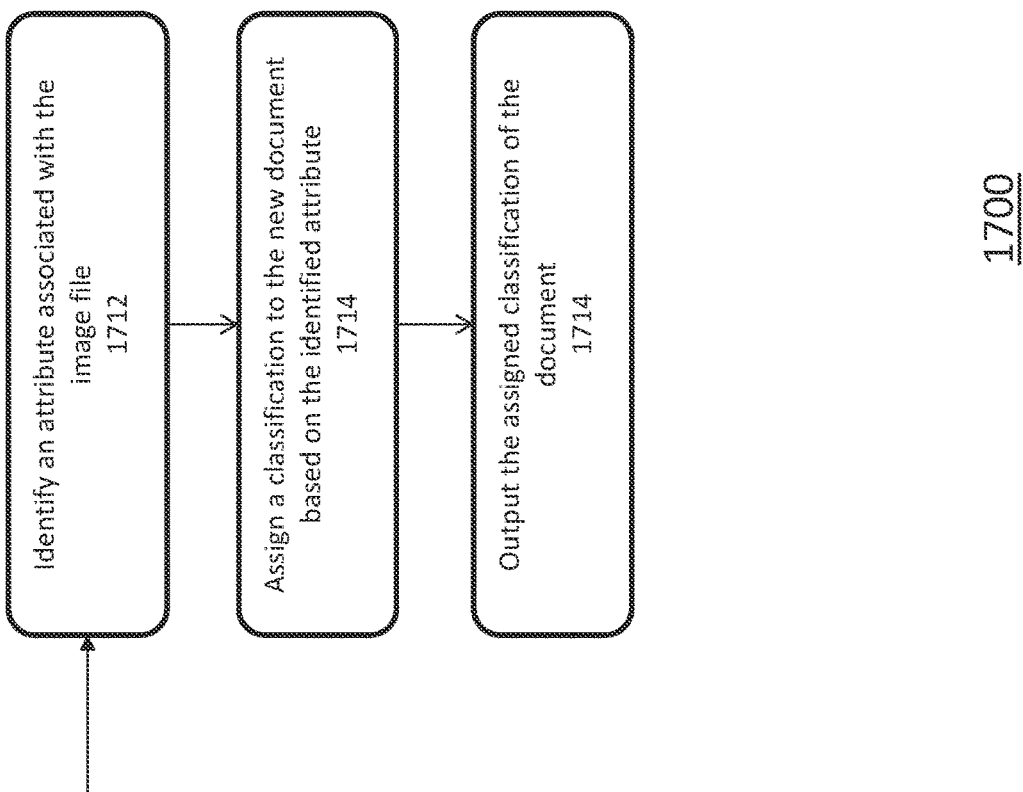
FIG. 17 is a flowchart illustrating a process for classifying a document using a trained learning model, according to example embodiments.
Figure 17:
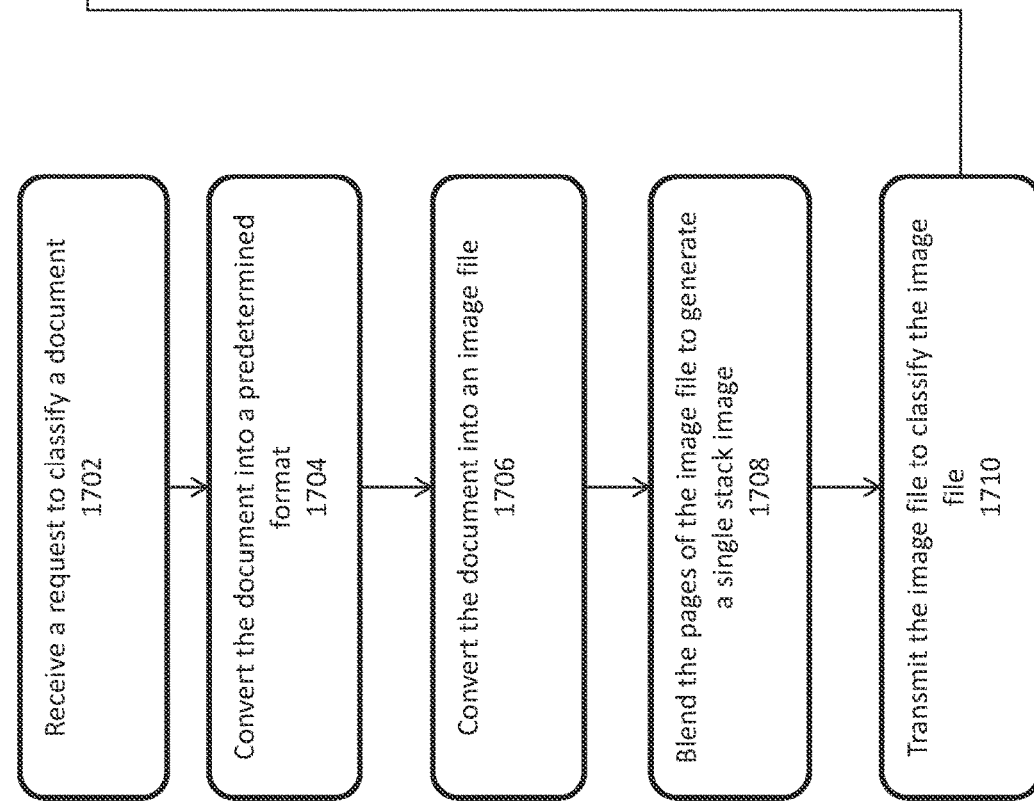

FIG. 17 is a flowchart illustrating the process for classifying a document using a trained learning model. Method 1700 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 17, as will be understood by a person of ordinary skill in the art.

Method 1700 shall be described with reference to FIG. 1. However, method 1700 is not limited to that example embodiment.

In operation 1702, server 100 receives a request to classify a document using a trained learning model. For example, server 100 receives a request to classify a pharmacovigilance (PV) document using a trained learning model. The PV document may be an individual case safety report (ICSR) regarding various drugs. An ICSR is a written report of an adverse event experienced by a patient undergoing a particular treatment or taking a particular drug, which may potentially be linked to that treatment or drug. The request may include a query to retrieve the PV document. Conversion engine 103 may retrieve the PV document from database 120. The request may be to classify the PV document using at least one of first, second, or third learning models 104-108. First, second, or third learning models 104-108 may be fully trained to assign a first, second, or third classification to a document, respectively.

In operation 1704, conversion engine 103 converts the document into an intermediate format, if not already in the intermediate or an image file format. For example, conversion engine 103 converts the PV document into a predetermined format if the document is not in the predetermined format. The predetermined format may be a PDF format.

In operation 1706, conversion engine 103 converts the document to an image file, if not already in image file format. For example, conversion engine 103 converts the PV document into an image file. The image file may be a JPEG image. The image file may include an image representation of the PV document.

In operation 1708, conversion engine 103 blends the pages of the image file to generate a single stack image. The single stack image may be a composite of the pages of the image file. The image file may include the single stack image.

In operation 1710, conversion engine 103 transmits the image file to learning engine 101 for classification.

In operation 1712, learning engine 101 identifies an attribute associated with the image file by executing image analysis on the image file. For example, at least one of first, second, or third learning models 104-108 identifies an attribute associated with the image file by executing image analysis on the image file. In an embodiment, image analysis may be executed by executing operations 1602-1612 of flowchart 1600 in FIG. 16. In some embodiments, learning engine 101 may instruct all three of first, second, or third learning models 104-108 to identify a first, second, and third attribute associated with the image file.

In operation 1714, learning engine 101 assigns a classification to the document based on the identified attribute. For example, the at least one of first, second, or third learning models 104-108 assigns a classification to the PV document using the identified attribute. As indicated above, first, second, or third learning models 104-108 may assign a first, second, or third classification, respectively. The first classification corresponds to the validity of the different PV document. The second classification corresponds to a seriousness of an adverse effect indicated on the different PV document. Finally, the third classification corresponds to whether the adverse effect indicated on the different PV document is serious, related, and expected. First, second, and third learning models 104-108 may implement the CNN algorithm to assign the first, second, and third classification, respectively.

In operation 1716, learning engine 101 outputs the assigned classification to a client device, such as an interface. For example, learning engine 101 outputs the assigned classification of the document to client device 110. The output may also include a confidence score indicating the likely accuracy of the given classification. For example, the output may indicate a 90% confidence score that the document is accurately classified as the first classification, second classification, or third classification. In some embodiments, a confidence score may be output for all three classifications. In some embodiments, the output is a priority ranking or percentage that takes into consideration the outputs (which may include confidence levels) of all three learning models.

Figure 18:
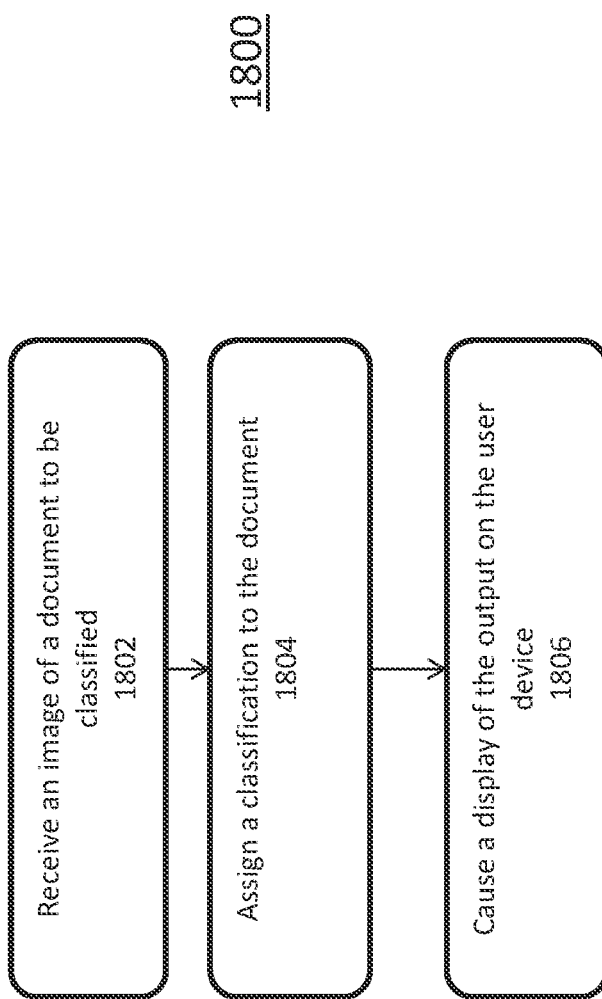
FIG. 18 is a flowchart illustrating the process for classifying a document using a trained learning model implemented on a user device, according to example embodiments.

FIG. 18 is a flowchart illustrating the process for classifying a document using a trained learning model implemented on a user device, according to example embodiments. Method 1800 may be performed by processing logic that may include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 18, as will be understood by a person of ordinary skill in the art.

Method 1800 shall be described with reference to FIG. 1. However, method 1800 is not limited to that example embodiment.

In operation 1802, user classification application 134 receives an image of a document to be classified. User classification application 134 may also receive an uploaded document to be classified. User classification application 134 may convert the image or the uploaded document into an image file including a single image stack, as described in method 1500 of FIG. 15. User classification application 134 may implement a fully trained learning engine to classify documents. For example, the learning engine may be analogous to learning engine 101. Furthermore, user classification application 134 may be configured to classify PV documents.

In operation 1804, user classification application 134 assigns a classification to the document using the image file. For example, user classification application 134 may assign a classification by executing steps 1704-1716 in method 1700. For example, the document may be a medical document, and the classification may indicate the seriousness of the content described in the medical document. User classification application 134 may generate an output including the classification, a recommendation of whether the user should consult a medical professional, and a confidence score. The confidence score indicates a likely accuracy of the classification. User classification application 134 may assign classification without identifying or extracting any PIT from the document.

In operation 1806, user application 134 may cause a display of the output on user device 130. User classification application 134 may also transmit the output to server 100 to store the output in database 120. This allows the user to receive a classification of a document without having to transmit the document to server 100. In this regard, user device 130 locally assigns the classification to the document. By doing so, the user's PII is protected from any potential security risks involved in transferring PII over a network.

Various embodiments can be implemented, for example, using one or more computer systems, such as computer system 1900 shown in FIG. 9. Computer system 900 can be used, for example, to implement methods 1500 of FIG. 15, 1600 of FIG. 16, 1700 of FIG. 17, and 1800 of FIG. 18. Furthermore, computer system 1900 can be at least part of server 100, client device 110, database 120, and user device 130, as shown in FIG. 1. For example, computer system 1900 route communication to various applications. Computer system 1900 can be any computer capable of performing the functions described herein.

Computer system 1900 can be any well-known computer capable of performing the functions described herein.

Computer system 1900 includes one or more processors (also called central processing units, or CPUs), such as a processor 1904. Processor 1904 is connected to a communication infrastructure or bus 1906.

One or more processors 1904 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1900 also includes user input/output device(s) 1903, such as monitors, keyboards, pointing devices, etc., that communicate with communication infrastructure 1906 through user input/output interface(s) 1902.

Computer system 1900 also includes a main or primary memory 1908, such as random access memory (RAM). Main memory 1908 can include one or more levels of cache. Main memory 1908 has stored therein control logic (i.e., computer software) and/or data.

Computer system 1900 can also include one or more secondary storage devices or memory 1910. Secondary memory 1910 can include, for example, a hard disk drive 1912 and/or a removable storage device or drive 1914. Removable storage drive 1914 can be a floppy disk drive, a magnetic tape drive, a compact disk drive, an optical storage device, tape backup device, and/or any other storage device/drive.

Removable storage drive 1914 can interact with a removable storage unit 1918. Removable storage unit 1918 includes a computer usable or readable storage device having stored thereon computer software (control logic) and/or data. Removable storage unit 1918 can be a floppy disk, magnetic tape, compact disk, DVD, optical storage disk, and/any other computer data storage device. Removable storage drive 1914 reads from and/or writes to removable storage unit 1918 in a well-known manner.

According to an exemplary embodiment, secondary memory 1910 can include other means, instrumentalities, or other approaches for allowing computer programs and/or other instructions and/or data to be accessed by computer system 1900. Such means, instrumentalities, or other approaches can include, for example, a removable storage unit 1922 and an interface 1920. Examples of the removable storage unit 1922 and the interface 1920 can include a program cartridge and cartridge interface (such as that found in video game devices), a removable memory chip (such as an EPROM or PROM) and associated socket, a memory stick, and USB port, a memory card, and associated memory card slot, and/or any other removable storage unit and associated interface.

Computer system 1900 can further include a communication or network interface 1924. Communication interface 1924 enables computer system 1900 to communicate and interact with any combination of remote devices, remote networks, remote entities, etc. (individually and collectively referenced by reference number 1928). For example, communication interface 1924 can allow computer system 1900 to communicate with remote devices 1928 over communications path 1926, which can be wired and/or wireless, and which can include any combination of LANs, WANs, the Internet, etc. Control logic and/or data can be transmitted to and from computer system 1900 via communication path 1926.

In an embodiment, a tangible, non-transitory apparatus or article of manufacture including a tangible, non-transitory computer useable or readable medium having control logic (software) stored thereon is also referred to herein as a computer program product or program storage device. This includes, but is not limited to, computer system 1900, main memory 1908, secondary memory 1910, and removable storage units 1918 and 1922, as well as tangible articles of manufacture embodying any combination of the foregoing. Such control logic, when executed by one or more data processing devices (such as computer system 1900), causes such data processing devices to operate as described herein.

Figure 19:
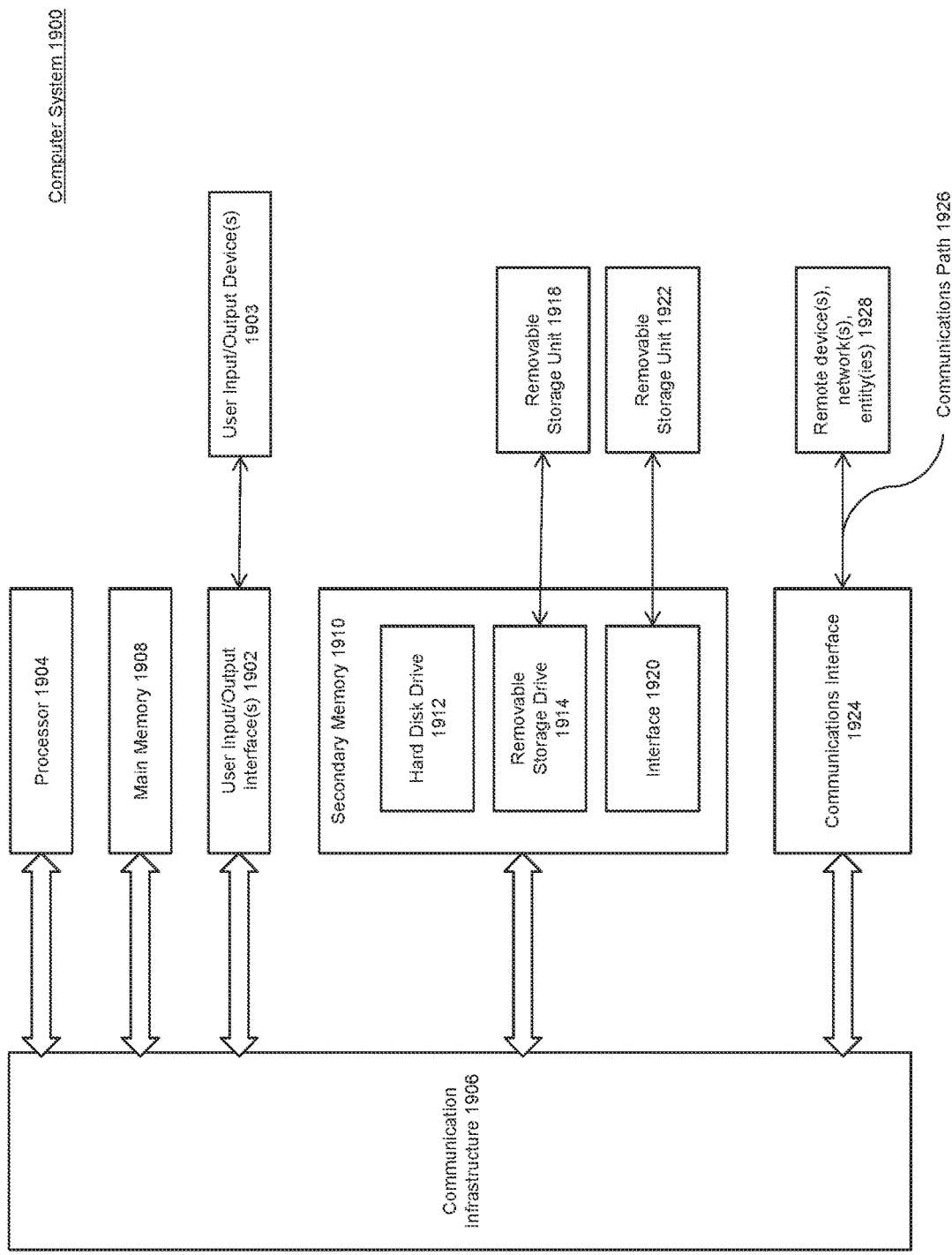
FIG. 19 is a block diagram of example components of a device according to an embodiment.

Based on the teachings contained in this disclosure, it will be apparent to persons skilled in the relevant art(s) how to make and use embodiments of this disclosure using data processing devices, computer systems, and/or computer architectures other than that shown in FIG. 19. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc., using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above described exemplary embodiments but should be defined only in accordance with the following claims and their equivalents.

What is claimed is:

1. A computer-implemented method when executed on data processing hardware causes the data processing hardware to perform operations comprising:
   receiving a request to classify a document;
   converting the document into a new image file;
   blending one or more pages of the new image file into a single image stack;
   assigning, using a trained learning engine, a first classification and a second classification to the document based on the single image stack; and
   determining a priority value of the document based on the first classification and the second classification.

2. The computer-implemented method of claim 1, wherein the first classification corresponds to a validity of the document and the second classification corresponds to an indicator of a seriousness of content from the document.

3. The computer-implemented method of claim 1, wherein the operations further comprise assigning, using the trained learning engine, a third classification to the document based on the single image stack.

4. The computer-implemented method of claim 3, wherein the third classification corresponds to one or more elements corresponding to a seriousness of content from the document.

5. The computer-implemented method of claim 1, wherein assigning the first classification and the second classification to the document comprises assigning the first classification and the second classification by executing image analysis.

6. The computer-implemented method of claim 5, wherein the document comprises an image file.

7. The computer-implemented method of claim 6, wherein executing the image analysis comprises:
   generating a feature map for the image file, the feature map comprising a set of features extracted from the image file;
   generating a reduced feature map for the image file by reducing a dimensionality characteristic of the feature map;
   transforming the reduced feature map for the image file into a vector; and
   performing a non-linear transformation on the vector to identify an attribute associated the image file.

8. The computer-implemented method of claim 1, wherein the trained learning engine comprises a machine learning model.

9. The computer-implemented method of claim 1, wherein the operations further comprise, recursively:
   identifying an attribute associated with the document by executing image analysis on the document,
   wherein assigning the first classification and the second classification to the document is further based on the identified attribute.

10. The computer-implemented method of claim 1, wherein the operations further comprise converting the document to a predetermined document type.

11. A system comprising:
    data processing hardware; and
    memory hardware in communication with the data processing hardware, the memory hardware storing instructions that when executed on the data processing hardware cause the data processing hardware to perform operations comprising:
    receiving a request to classify a document;
    converting the document into a new image file;
    blending one or more pages of the new image file into a single image stack;
    assigning, using a trained learning engine, a first classification and a second classification to the document based on the single image stack; and
    determining a priority value of the document based on the first classification and the second classification.

12. The system of claim 11, wherein the first classification corresponds to a validity of the document and the second classification corresponds to an indicator of a seriousness of content from the document.

13. The system of claim 11, wherein the operations further comprise assigning, using the trained learning engine, a third classification to the document based on the single image stack.

14. The system of claim 13, wherein the third classification corresponds to one or more elements corresponding to a seriousness of content from the document.

15. The system of claim 11, wherein assigning the first classification and the second classification to the document comprises assigning the first classification and the second classification by executing image analysis.

16. The system of claim 15, wherein the document comprises an image file.

17. The system of claim 16, wherein executing the image analysis comprises:
    generating a feature map for the image file, the feature map comprising a set of features extracted from the image file;
    generating a reduced feature map for the image file by reducing a dimensionality characteristic of the feature map;
    transforming the reduced feature map for the image file into a vector; and
    performing a non-linear transformation on the vector to identify an attribute associated the image file.

18. The system of claim 11, wherein the trained learning engine comprises a machine learning model.

19. The system of claim 11, wherein the operations further comprise, recursively:
  identifying an attribute associated with the document by executing image analysis on the document,
  wherein assigning the first classification and the second classification to the document is further based on the identified attribute.

20. The system of claim 11, wherein the operations further comprise converting the document to a predetermined document type.

* * * * *